(12) United States Patent
Smaldone et al.

(10) Patent No.: US 8,720,084 B2
(45) Date of Patent: May 13, 2014

(54) IMPACT ATTENUATING AND SPRING ELEMENTS AND PRODUCTS CONTAINING SUCH ELEMENTS

(71) Applicant: NIKE, Inc., Beaverton, OR (US)

(72) Inventors: Patricia L. Smaldone, Portland, OR (US); Michael A. Aveni, Lake Oswego, OR (US); Fred G. Fagergren, Hillsboro, OR (US)

(73) Assignee: NIKE, Inc.

( * ) Notice: Subject to any disclaimer, the term of this patent is extended or adjusted under 35 U.S.C. 154(b) by 0 days.

(21) Appl. No.: 13/735,134

(22) Filed: Jan. 7, 2013

(65) Prior Publication Data

US 2013/0118034 A1    May 16, 2013

Related U.S. Application Data

(62) Division of application No. 12/886,078, filed on Sep. 20, 2010, now Pat. No. 8,348,031, which is a division of application No. 11/966,513, filed on Dec. 28, 2007, now Pat. No. 7,798,298, which is a division of application No. 10/949,812, filed on Sep. 27, 2004, now Pat. No. 7,314,125.

(51) Int. Cl.
    *A43B 13/18*    (2006.01)
    *F16F 7/12*     (2006.01)
    *F16F 1/371*    (2006.01)
    *F16F 1/36*     (2006.01)

(52) U.S. Cl.
    USPC ............... 36/28; 36/35 R; 188/372; 267/141; 267/145; 267/152; 267/153

(58) Field of Classification Search
    USPC .......... 188/371, 372, 376, 377; 267/106, 107, 267/108, 109, 141, 142, 143, 145, 151, 152, 267/153, 164, 165; 36/27, 28, 35 R, 36 R, 38
    See application file for complete search history.

(56) References Cited

U.S. PATENT DOCUMENTS 807,314 A * 12/1905 Pebble ............................ 248/595
1,942,312 A   1/1934 Tutoky
(Continued)

FOREIGN PATENT DOCUMENTS

CA    2279604    2/2001
CN    1159148    9/1997
(Continued)

OTHER PUBLICATIONS

Nike Shox Turbo, dated May 11, 2004, Internet Printout: http://niketown.nike.com.

(Continued)

*Primary Examiner* — Thomas J Williams
(74) *Attorney, Agent, or Firm* — Banner & Witcoff, Ltd.

(57) ABSTRACT

Impact attenuating/spring systems may include first and second body portions and at least one spring member at least partially included between the body portions. The spring member(s) may substantially enclose and/or be pivotally engaged with the body portion(s). The components of the impact attenuating and spring element may be arranged such that when a force is applied to the body portion(s), the spring member(s) will exert a counter force to urge the impact attenuating and spring element back toward its original orientation. The spring members may include one or more polymeric element that stretches under a tensile force. The impact attenuating and spring elements may be included in a piece of footwear or other device in a manner such that a user or a retailer (or others) can select an appropriate spring member (or portion thereof), e.g., depending on characteristics of the user or the intended use.

16 Claims, 25 Drawing Sheets

(56) References Cited

U.S. PATENT DOCUMENTS

| | | |
|---|---|---|
| 2,437,227 A | 3/1948 | Hall |
| 2,669,038 A | 2/1954 | De Werth |
| 3,204,913 A | 9/1965 | Lawrence et al. |
| 4,342,158 A | 8/1982 | McMahon et al. |
| 4,492,374 A | 1/1985 | Lekhtman et al. |
| 4,535,553 A | 8/1985 | Derderian et al. |
| 4,536,974 A | 8/1985 | Cohen |
| 4,566,678 A | 1/1986 | Anderson |
| 4,592,153 A | 6/1986 | Jacinto |
| 4,611,412 A | 9/1986 | Cohen |
| 4,638,575 A * | 1/1987 | Illustrato ............... 36/28 |
| 4,673,170 A * | 6/1987 | Dykema ............... 267/174 |
| 4,715,130 A | 12/1987 | Scatena |
| 4,753,021 A | 6/1988 | Cohen et al. |
| 4,774,774 A | 10/1988 | Allen, Jr. |
| 4,815,221 A | 3/1989 | Diaz |
| 4,843,737 A * | 7/1989 | Vorderer ............... 36/27 |
| 4,894,934 A | 1/1990 | Illustrato |
| 4,901,987 A | 2/1990 | Greenhill et al. |
| 4,914,836 A | 4/1990 | Horovitz |
| 5,138,776 A | 8/1992 | Levin |
| 5,205,798 A | 4/1993 | Lekhtman |
| 5,224,277 A | 7/1993 | Sang Do |
| 5,224,280 A | 7/1993 | Preman et al. |
| 5,280,890 A | 1/1994 | Wydra |
| 5,337,492 A | 8/1994 | Anderie et al. |
| 5,343,639 A | 9/1994 | Kilgore et al. |
| 5,353,526 A | 10/1994 | Foley et al. |
| 5,409,200 A | 4/1995 | Zingher et al. |
| 5,461,800 A | 10/1995 | Luthi et al. |
| 5,513,448 A | 5/1996 | Lyons |
| D376,471 S | 12/1996 | Kalin et al. |
| 5,588,165 A | 12/1996 | Fromme |
| 5,643,148 A | 7/1997 | Naville |
| 5,701,685 A | 12/1997 | Pezza |
| 5,743,028 A | 4/1998 | Lombardino |
| 5,822,886 A | 10/1998 | Luthi et al. |
| 5,871,298 A | 2/1999 | Lekhtman et al. |
| 5,875,568 A | 3/1999 | Lennihan, Jr. |
| 5,916,071 A | 6/1999 | Lee |
| 6,006,449 A | 12/1999 | Orlowski et al. |
| 6,055,747 A | 5/2000 | Lombardino |
| 6,266,897 B1 | 7/2001 | Seydel et al. |
| 6,282,814 B1 | 9/2001 | Krafsur et al. |
| D450,437 S | 11/2001 | Simpson et al. |
| 6,318,001 B1 | 11/2001 | Lee |
| 6,374,514 B1 | 4/2002 | Swigart |
| 6,393,731 B1 | 5/2002 | Moua et al. |
| 6,401,887 B1 | 6/2002 | Hur |
| 6,457,261 B1 | 10/2002 | Crary |
| 6,516,540 B2 | 2/2003 | Seydel et al. |
| 6,523,281 B1 | 2/2003 | Lennihan, Jr. |
| 6,530,564 B1 | 3/2003 | Julien |
| 6,533,258 B2 | 3/2003 | Monson et al. |
| 6,546,648 B2 | 4/2003 | Dixon |
| 6,553,692 B1 | 4/2003 | Chung |
| 6,568,102 B1 | 5/2003 | Healy et al. |
| 6,598,320 B2 | 7/2003 | Turner et al. |
| 6,665,957 B2 | 12/2003 | Levert et al. |
| 6,669,184 B2 | 12/2003 | Cai et al. |
| 6,684,531 B2 * | 2/2004 | Rennex ............... 36/27 |
| 6,722,670 B1 | 4/2004 | Lee |
| 6,751,891 B2 | 6/2004 | Lombardino |
| 6,807,753 B2 | 10/2004 | Steszyn et al. |
| 6,880,267 B2 | 4/2005 | Smaldone et al. |
| 6,886,274 B2 | 5/2005 | Krafsur et al. |
| 6,994,333 B2 | 2/2006 | Lobry et al. |
| 6,996,922 B2 | 2/2006 | Ryoo |
| 7,290,354 B2 * | 11/2007 | Perenich ............... 36/27 |
| 7,314,124 B2 * | 1/2008 | Martyn et al. ............... 188/318 |
| 7,314,125 B2 | 1/2008 | Smaldone et al. |
| 7,441,347 B2 | 10/2008 | Levert et al. |
| 7,458,172 B2 | 12/2008 | Aveni |
| 7,730,635 B2 * | 6/2010 | Aveni et al. ............... 36/27 |
| 7,757,410 B2 | 7/2010 | Aveni et al. |
| 7,798,298 B2 * | 9/2010 | Smaldone et al. ............... 188/372 |
| 7,877,898 B2 * | 2/2011 | Aveni et al. ............... 36/28 |
| 8,146,270 B2 * | 4/2012 | Aveni et al. ............... 36/27 |
| 8,225,531 B2 * | 7/2012 | Aveni et al. ............... 36/28 |
| 8,261,469 B2 * | 9/2012 | Aveni et al. ............... 36/28 |
| 8,348,031 B2 * | 1/2013 | Smaldone et al. ............... 188/372 |
| 2002/0163114 A1 | 11/2002 | Lobry et al. |
| 2003/0110661 A1 | 6/2003 | Wu |
| 2003/0121178 A1 | 7/2003 | Rennex |
| 2003/0126760 A1 | 7/2003 | Levert et al. |
| 2003/0192200 A1 | 10/2003 | Dixon |
| 2004/0040180 A1 * | 3/2004 | Rennex et al. ............... 36/27 |
| 2004/0049946 A1 | 3/2004 | Lucas et al. |
| 2004/0068892 A1 | 4/2004 | Wang |
| 2004/0121077 A1 | 6/2004 | Park et al. |
| 2004/0128860 A1 | 7/2004 | Smaldone et al. |
| 2004/0154191 A1 | 8/2004 | Park |
| 2005/0028403 A1 | 2/2005 | Swigart et al. |
| 2005/0102857 A1 | 5/2005 | Yen |
| 2005/0204584 A1 | 9/2005 | Ryoo |
| 2005/0262725 A1 * | 12/2005 | Rennex et al. ............... 36/27 |
| 2006/0064900 A1 | 3/2006 | Aveni |
| 2006/0065499 A1 | 3/2006 | Smaldone et al. |
| 2006/0112592 A1 | 6/2006 | Leedy et al. |
| 2006/0288612 A1 | 12/2006 | Lucas et al. |
| 2007/0033830 A1 | 2/2007 | Chang |
| 2007/0113425 A1 | 5/2007 | Wakley et al. |
| 2007/0119074 A1 | 5/2007 | Aveni et al. |
| 2007/0193065 A1 | 8/2007 | Nishiwaki et al. |
| 2007/0277395 A1 | 12/2007 | Aveni et al. |
| 2009/0126224 A1 | 5/2009 | Greene et al. |

FOREIGN PATENT DOCUMENTS

| | | | |
|---|---|---|---|
| CN | 1509766 A | | 7/2004 |
| DE | 3048787 | | 7/1982 |
| DE | 3048787 A | * | 7/1982 |
| DE | 20000403 | | 5/2001 |
| DE | 10060636 A1 | * | 7/2002 |
| EP | 1530913 | | 5/2005 |
| JP | 03195503 | | 7/1997 |
| WO | 9520333 | | 8/1995 |
| WO | 9609778 | | 4/1996 |
| WO | WO 9609778 A1 | * | 4/1996 |
| WO | 03036608 | | 4/2006 |
| WO | 2006036721 | | 4/2006 |
| WO | 2007145809 | | 12/2007 |

OTHER PUBLICATIONS

International Search Report, issued Dec. 16, 2005, in counterpart International Patent Application No. PCT/US2005/033275.

International Search Report and Written Opinion, issued Jun. 1, 2006, in counterpart International Patent Application No. PCT/US2005/033920.

International Preliminary Report on Patentability and Written Opinion, issued Mar. 27, 2007, in counterpart International Patent Application No. PCT/US2005/033275.

Office Action, issued Apr. 4, 2008, in Chinese Patent Application No. 200580032467.3, which corresponds to U.S. Appl. No. 10/949,813.

Office Action, issued Apr. 18, 2008, in Chinese Patent Application No. 200580032466.9, which corresponds to U.S. Appl. No. 10/949,812.

International Search Report and Written Opinion, issued Nov. 21, 2008, in counterpart International Patent Application No. PCT/US2007/012665.

International Preliminary Report on Patentability, issued Dec. 31, 2008, in counterpart International Patent Application No. PCT/US2007/012665.

Office Action, issued Jan. 23, 2009, in Chinese Patent Application No. 200580032466.9, which corresponds to U.S. Appl. No. 10/949,812.

Communication, issued Mar. 23, 2009, in European Patent Application No. 05798648.1, which corresponds to U.S. Appl. No. 10/949,812.

Office Action, issued Jan. 12, 2010, in Chinese Patent Application No. 200780025074.9, which corresponds to U.S. Appl. No. 10/949,812.

(56) References Cited

OTHER PUBLICATIONS

Office Action, issued Jun. 23, 2010, in Chinese Patent Application No. 200910117819.5, which corresponds to U.S. Appl. No. 10/949,813.
Office Action, issued Sep. 26, 2010, in Chinese Patent Application No. 200780025074.9, which correspondes to U.S. Appl. No. 10/949,812.
Office Action, issued Dec. 21, 2010, in counterpart European Patent Application No. 05799773.6.
Office Action, issued May 4, 2011, in counterpart European Patent Application No. 07795452.7.
Extended European Search Report, issued May 26, 2011, in counterpart European Patent Application No. 11160815.4.
Extended European Search Report, issued May 26, 2011, in counterpart European Patent Application No. 11160816.2.
Extended European Search Report, issued May 30, 2011, in counterpart European Patent Application No. 11160811.3.
Non-Final Office Action, issued Jun. 27, 2011, in counterpart U.S. Appl. No. 12/753,178.
Office Action, issued Aug. 8, 2011, in counterpart European Patent Application No. 05798648.1.
Office Action, issued Apr. 24, 2012, in counterpart European Patent Application No. 07795452.7.
Non-Final Office Action, issued May 28, 2013, in corresponding U.S. Appl. No. 13/735,083.
First Office Action, issued Mar. 22, 2013, in corresponding CN Patent Application No. 201110150389.4.
Non-Final Office Action, issued Jun. 28, 2013, in corresponding U.S. Appl. No. 13/403,204.
Final Office Action, issued Sep. 6, 2013, in corresponding U.S. Appl. No. 13/735,083.

\* cited by examiner

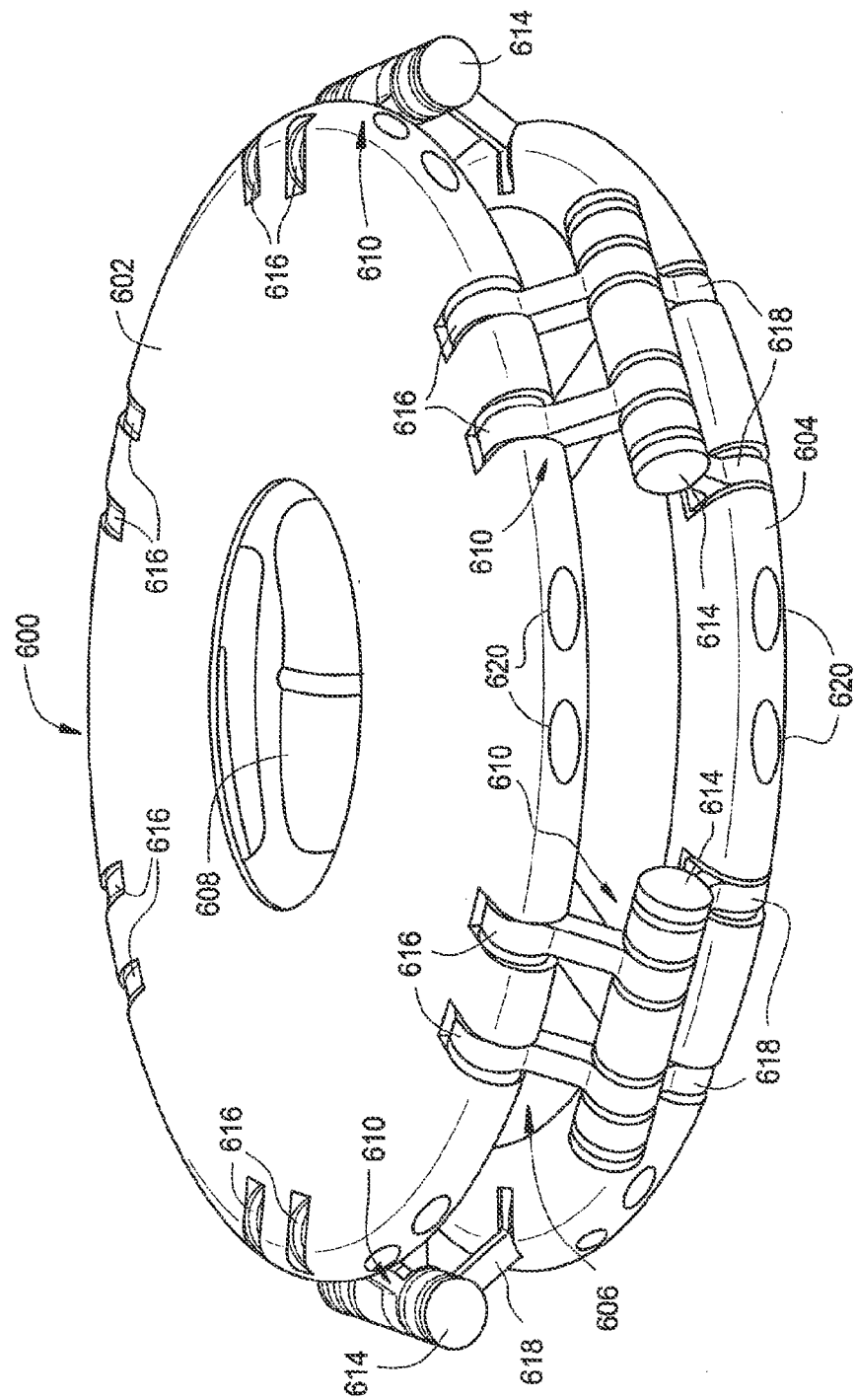

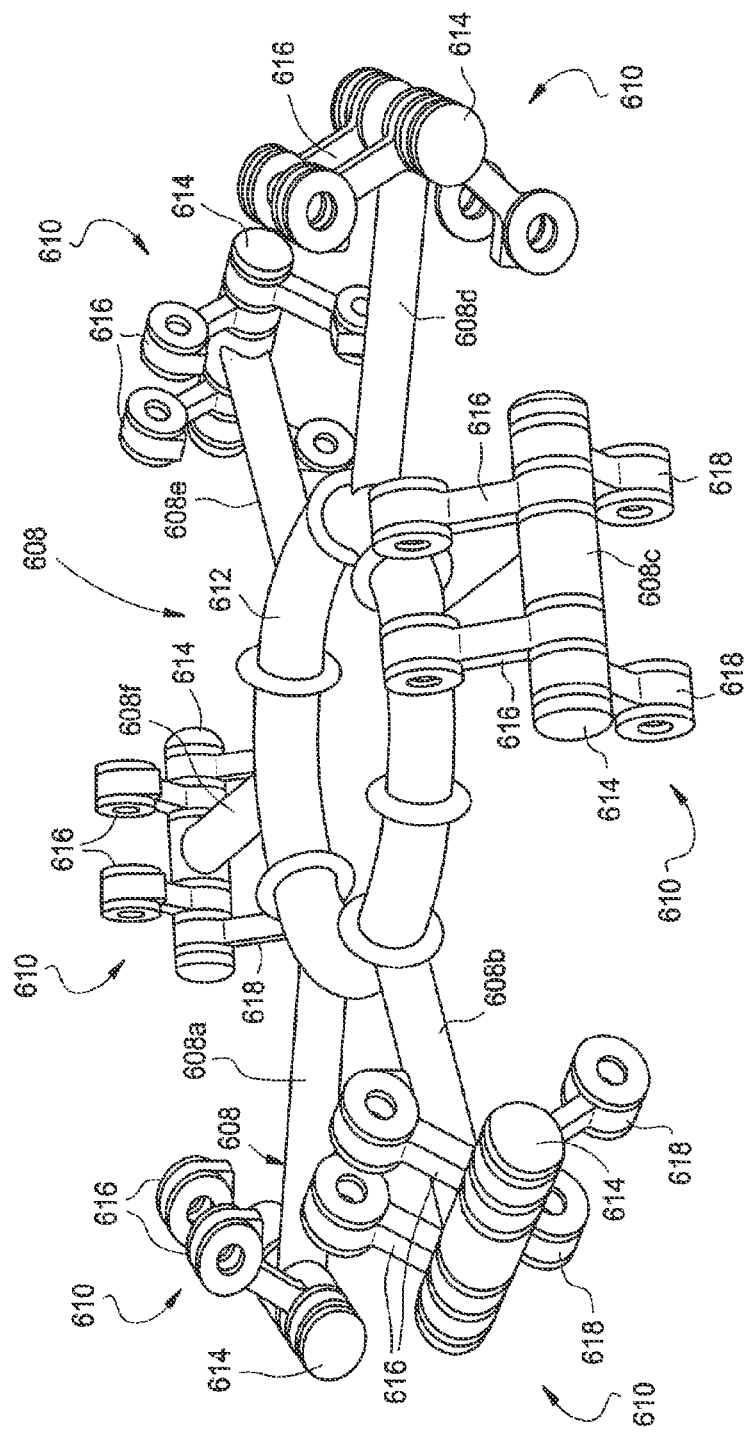

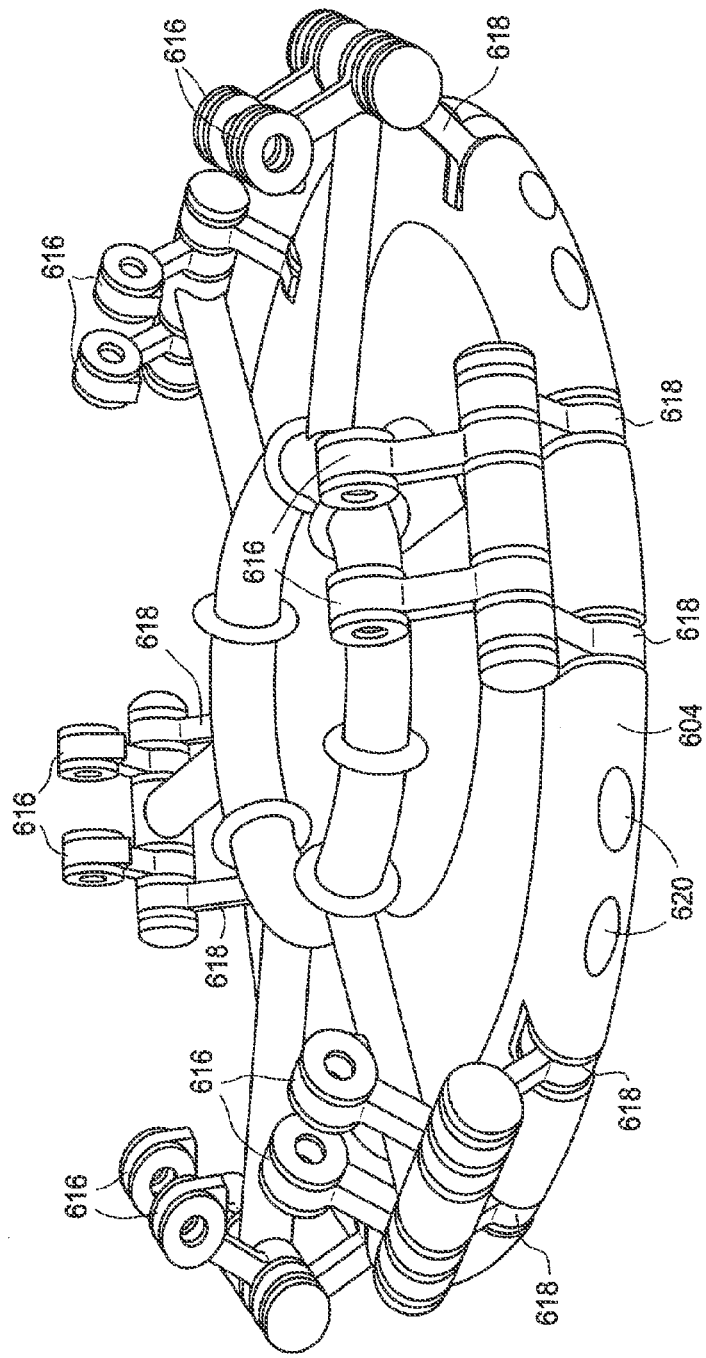

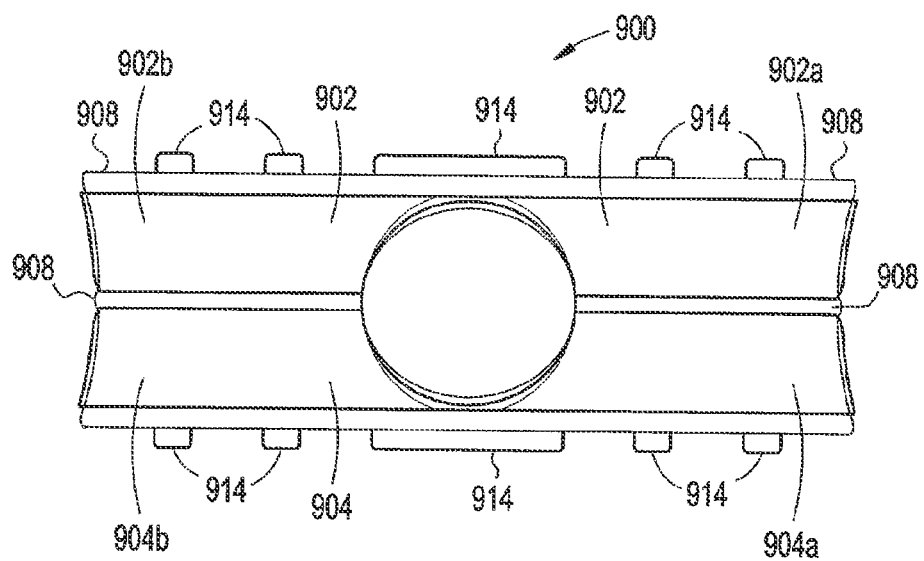

IMPACT ATTENUATING AND SPRING ELEMENTS AND PRODUCTS CONTAINING SUCH ELEMENTS

CROSS-REFERENCE TO RELATED APPLICATION

This application is a divisional of pending U.S. patent application Ser. No. 12/886,078, filed on Sep. 20, 2010, which is a divisional of U.S. Pat. No. 7,798,298, filed on Dec. 28, 2007 and issued Sep. 21, 2010, which is a divisional of U.S. Pat. No. 7,314,125 filed on Sep. 27, 2004 and issued on Jan. 1, 2008, the contents of each being incorporated herein by reference in their entirety.

FIELD OF THE INVENTION

The invention relates generally to impact attenuating and spring elements. Such elements may be provided in a wide variety of different products, e.g., in footwear products and other foot-receiving devices, such as in the heel and/or toe areas of footwear products. This application generally relates to impact attenuating elements like those described in concurrently filed U.S. patent application Ser. No. 10/949,813, entitled "Impact Attenuating Devices and Products Containing Such Devices," naming Michael Aveni as an inventor. This concurrently filed U.S. patent application is entirely incorporated herein by reference.

BACKGROUND

Conventional articles of athletic footwear have included two primary elements, namely an upper and a sole member or structure. The upper provides a covering for the foot that securely receives and positions the foot with respect to the sole structure. In addition, the upper may have a configuration that protects the foot and provides ventilation, thereby cooling the foot and removing perspiration. The sole structure generally is secured to a lower portion of the upper and generally is positioned between the foot and the ground. In addition to attenuating ground reaction forces (i.e., imparting cushioning), the sole structure may provide traction and control foot motions, such as pronation. Accordingly, the upper and the sole structure operate cooperatively to provide a comfortable structure that is suited for a variety of ambulatory activities, such as walking and running.

The sole member or structure of athletic footwear generally exhibits a layered configuration that includes a comfort-enhancing insole, a resilient midsole formed from a polymer foam material, and a ground-contacting outsole that provides both abrasion-resistance and fraction. The midsole is the primary sole structure element that attenuates ground reaction forces and controls foot motions. Suitable polymer foam materials for the midsole include ethylvinylacetate or polyurethane that compress resiliently under an applied load to attenuate ground reaction forces. Conventional polymer foam materials are resiliently compressible, in part, due to the inclusion of a plurality of open or closed cells that define an inner volume substantially displaced by gas.

As noted above, various impact attenuating elements and systems have been known, including such elements and systems for use in footwear products. Conventionally, the insole, midsole, and/or outsole portions of footwear products may include foam or other materials that attenuate shock and dampen vibrations, e.g., in the heel and/or toe areas of a shoe. In at least some instances, a relatively large volume of foam or other material may be needed to fully or sufficiently attenuate the impact force to which footwear products are subjected and to provide sufficient support and/or comfort. This is particularly true for athletic footwear, which may be subjected to relatively high impact forces, e.g., from running, jumping, twisting, changing directions, participating in athletic field events, and the like. An excessively high volume of impact attenuating material, if necessary to adequately attenuate ground reaction forces and/or provide support, may make the shoe stand too tall vertically, particularly for use as an athletic shoe.

Moreover, even when conventional foam materials provide adequate impact attenuation and comfort properties for use in footwear products, these materials do little or nothing in returning energy back to the footwear user. Rather, foam materials typically recover from compression and return to their original shape relatively slowly and with little or no return or "spring-back". Additionally, if a compression force persists on the foam material, this force may further prevent or slow the material's recovery.

Accordingly, it would be useful to provide an impact attenuating element that attenuates impact forces (e.g., ground reaction forces), and provides return or "spring-back" energy, e.g., for use in footwear products and/or other foot-receiving devices. Advantageously, such impact attenuating and spring elements will provide these useful properties without excessively adding to the height of the footwear or other product.

SUMMARY

The following presents a general summary of aspects of the invention in order to provide a basic understanding of at least some aspects of the invention. This summary is not an extensive overview of the invention. It is not intended to identify key or critical elements of the invention or to delineate the scope of the invention. The following summary merely presents some concepts of the invention in a general form as a prelude to the more detailed description provided below.

Aspects of this invention relate to impact attenuating and spring elements and systems and products in which they are used (such as footwear, other foot-receiving devices, and the like). In at least some examples, impact attenuating and spring elements in accordance with this invention will attenuate a component of an incident impact force from a first direction (e.g., a vertical force component), which action induces a corresponding displacement of at least a portion of the element in a different direction (e.g., a horizontal displacement). Additionally, the displacement may be used to "load" a spring member (e.g., stretch a horizontally arranged spring member), which then quickly returns to its original, unloaded orientation, releasing at least some energy back in a direction opposite to the original direction of the impact force.

Impact attenuating and spring elements in accordance with at least some example aspects of this invention may include, for example: (a) a first body portion; (b) a second body portion, wherein the first body portion and the second body portion, at least in part, define a base orientation of the impact attenuating and spring element, and wherein an open space is defined between the first and second body portions; and (c) one or more spring members, optionally at least partially included in the open space, and pivotally engaged with respect to at least one of the first body portion or the second body portion. The various portions of the impact attenuating and spring element may be arranged such that when a force is applied to at least one of the first body portion or the second body portion so as to change the impact attenuating and spring element out of the base orientation (e.g., compress the body portions together), the spring member(s) will exert a counter force that urges the impact attenuating and spring element back toward the base orientation. The spring members may include, for example, at least one polymeric element that stretches under a tensile force and returns to its original shape and/or size (or substantially its original shape and/or size) when the force is released.

Aspects of the invention also relate to impact attenuating and spring elements that include, for example: (a) a first arched body portion; (b) a second arched body portion facing the first arched body portion such that an open space is defined between the body portions; and (c) a spring member at least partially included in the open space and extending to at least substantially contain the first arched body portion and the second arched body portion. In this example impact attenuating and spring element, when a force is applied to at least one of the first arched body portion or the second arched body portion so as to change an orientation of the impact attenuating and spring element, the first spring member exerts a force that urges the impact attenuating and spring element back toward its original orientation. In at least some examples, at least one edge of one or both of the arched body portions may be rounded so as to allow a pivotal engagement between the arched body portion(s) and the spring member.

Impact attenuating and spring elements of the type described above may be included in pieces of footwear and/or other foot-receiving devices in accordance with additional aspects of this invention.

Additional aspects of the invention relate to methods for including impact attenuating and spring elements in products, such as in pieces of footwear or other foot-receiving devices. Such methods may include, for example: (a) providing an upper member and a sole member for a piece of footwear or other foot-receiving device; (b) selecting at least a portion of an impact attenuating and spring element (e.g., at least a spring member) at least in part based on a characteristic of an intended user of the piece of footwear or other foot-receiving device (e.g., user weight, foot width, running/walking speed capabilities, jumping capabilities, typical gait or stride characteristics (e.g., a pronation or supination tendency, etc.), etc.), or a characteristic of an intended use of the piece of footwear or other foot-receiving device (e.g., for a specific sport or training type); and (c) providing at least the portion of the impact attenuating and spring element between the upper member and the sole member of the piece of footwear or other foot-receiving device and/or engaging at least the portion of the impact attenuating and spring element with at least one of the upper member or the sole member. The impact attenuating and spring elements and/or the portions thereof may be of the type described generally above, and one or more of them may be freely removed or replaced in the piece of footwear or other foot-receiving device, for example, at a point of sale location (e.g., depending on characteristics of the intended user or its ultimate intended use), at a warehouse, at a manufacturing location, or by the user (e.g., at a point of use location, depending on the desired characteristics at a given time, for a given use, etc.).

BRIEF DESCRIPTION OF THE DRAWINGS

A more complete understanding of the present invention and certain advantages thereof may be acquired by referring to the following description in consideration with the accompanying drawings, in which like reference numbers indicate like features, and wherein:

FIGS. 6A through 6C illustrate an example impact attenuating and spring element with separate hinge members in accordance with aspects of this invention;

FIGS. 9A through 9C illustrate another example impact attenuating and spring element with a spring member that at least partially encloses the body portions of the element in accordance with aspects of this invention;

DETAILED DESCRIPTION

Figure 1A:
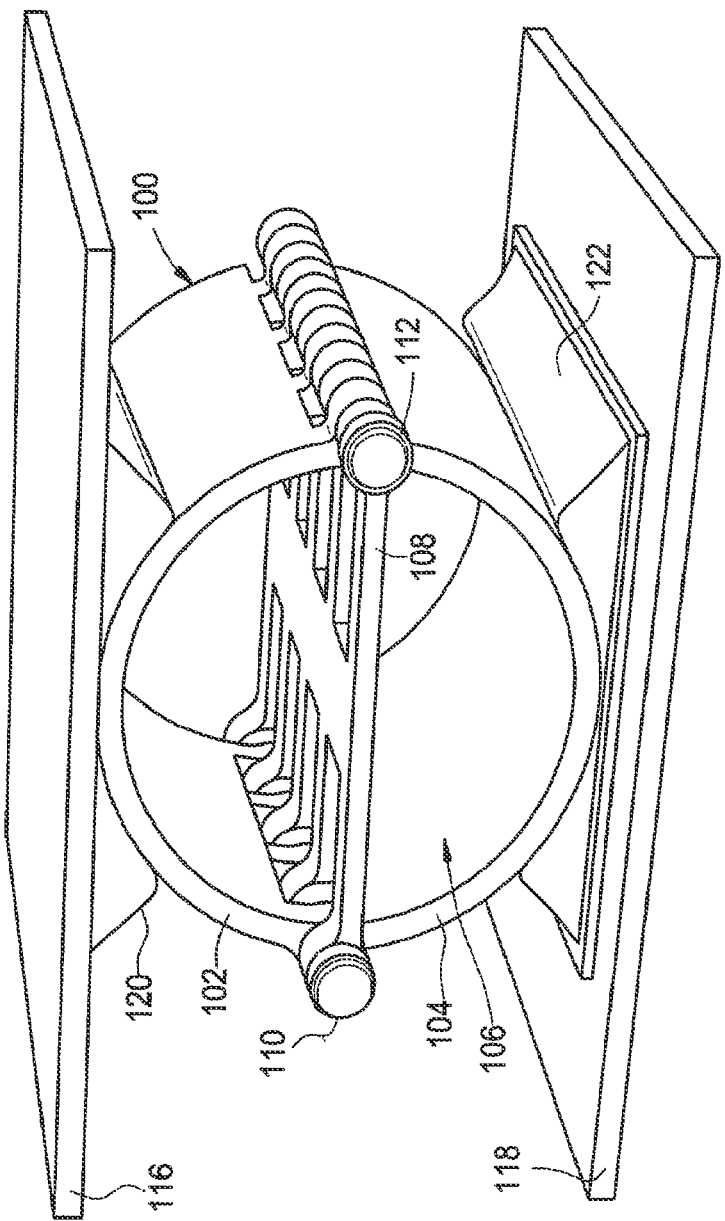
FIGS. 1A and 1B illustrate an example impact attenuating and spring element in accordance with aspects of this invention.

In the following description of various examples of the invention, reference is made to the accompanying drawings, which form a part hereof, and in which is shown by way of illustration various example systems and environments in which the invention may be practiced. It is to be understood that other specific arrangements of parts, example systems, and environments may be utilized and structural and functional modifications may be made without departing from the scope of the present invention. Also, while the terms "top," "bottom," "side," "front," "back," and the like may be used in this specification to describe various example features and elements of the invention, these terms are used herein as a matter of convenience, e.g., based on the example orientations shown in the figures. Nothing in this specification should be construed as requiring a specific three dimensional orientation of structures in order to fall within the scope of this invention.

To assist the reader, this specification is broken into various subsections, as follows: Terms; General Description of Impact Attenuating and Spring Systems According to the Invention; Specific Examples of the Invention; and Conclusion.

A. Terms

The following terms are used in this specification, and unless otherwise noted or clear from the context, these terms have the meanings provided below.

"Foot-receiving device" means any device into which a user places at least some portion of his or her foot. In addition to all types of footwear (described below), foot-receiving devices include, but are not limited to: bindings and other devices for securing feet in snow skis, cross country skis, water skis, snowboards, and the like; bindings, clips, or other devices for securing feet in pedals for use with bicycles, exercise equipment, and the like; bindings, clips, or other devices for receiving feet during play of video games or other games; and the like.

"Footwear" means any type of wearing apparel for the feet, and this term includes, but is not limited to: all types of shoes, boots, sneakers, sandals, thongs, flip-flops, mules, scuffs, slippers, sport-specific shoes (such as golf shoes, tennis shoes, baseball cleats, soccer or football cleats, ski boots, etc.), and the like.

B. General Description of Impact Attenuating and Spring Systems According to the Invention In general, aspects of this invention relate to impact attenuating and spring systems, products in which they are used (such as footwear, other foot-receiving devices, and the like), and methods for including them in footwear, foot-receiving devices, and the like. Impact attenuating and spring elements in accordance with at least some example aspects of this invention may include, for example: (a) a first body portion; (b) a second body portion, wherein the first and second body portions, at least in part, define a base orientation of the impact attenuating and spring element, and wherein an open space is defined between the first and second body portions; and (c) a first spring member at least partially included in the open space and pivotally engaged with respect to at least one of the first body portion or the second body portion. The various portions of the impact attenuating and spring element may be arranged such that when a force is applied to at least one of the first body portion or the second body portion so as to change the impact attenuating and spring element out of its base orientation (e.g., a vertical compressive force from stepping down on a shoe, landing a jump, etc.), the first spring member will displace in another direction (e.g., stretch in a horizontal direction) and then will exert a counter force that urges the impact attenuating and spring element back toward the base orientation.

Devices in accordance with at least some examples of this invention may include more than one spring member of the type described above. The spring members may include, for example, at least one polymeric element that stretches under a tensile force and returns to its original shape and/or size (or substantially its original shape and/or size) when the force is released.

The spring member(s) may be located at any suitable or desired location in the impact attenuating and spring element without departing from the invention. For example, in some impact attenuating and spring elements according to the invention, the spring member(s) may extend across the open space at a central location between the first and second body portions. As another example, in some impact attenuating and spring elements according to the invention, one or more spring members may extend across the open space at a location proximate to a central portion of one of the body portions (optionally, if desired, one or more additional spring members may extend across the open space at a location proximate to a central portion of the other body portion). In still other examples, the spring member(s) may be located outside the open space defined by the body portions. Combinations of these various spring member positions and orientations also may be used without departing from this invention.

The pivotal engagement between the spring member(s) and at least one of the body portions also may be provided in any suitable or desired manner without departing from the invention. For example, impact attenuating and spring elements in accordance with at least some examples of this invention may include a first shaft connecting the first body portion, the second body portion, and the first spring member in a pivotal manner at a first location and a second shaft connecting the first body portion, the second body portion, and the first spring member in a pivotal manner at a second location (e.g., a shaft along each side edge of the first and second body portions and the spring member(s)). The first and second body portions and the spring member(s) also may be connected to one another at one or multiple locations along their side edges. As another example, independent hinge members may be provided to pivotally engage the body portions with the spring member(s). As still another example, one spring member may be pivotally engaged with one body portion and a second spring member may be pivotally engaged with another body portion. In yet another example impact attenuating and spring element in accordance with aspects of the invention, one or more of the body portions may include rounded edges that provide the pivotal engagement with the first spring member under the incident force being attenuated. Other arrangements and/or combinations of the above arrangements also are possible without departing from this invention.

Aspects of the invention also relate to impact attenuating and spring elements that include, for example: (a) a first arched body portion; (b) a second arched body portion facing the first arched body portion, wherein an open space is defined between the body portions; and (c) a first spring member at least partially included in the open space and extending to at least substantially contain the first arched body portion and the second arched body portion. In this example impact attenuating and spring element, when a force is applied to at least one of the first or second arched body portions so as to change an orientation of the impact attenuating and spring element, the first spring member exerts a force that urges the impact attenuating and spring element back toward its original orientation. Optionally, impact attenuating and spring elements in accordance with these aspects of the invention further may include: (d) a third arched body portion; and (e) a fourth arched body portion facing the third arched body portion, wherein a second open space is defined between the third and fourth arched body portions, wherein the first spring member is at least partially included in the second open space and extends to at least substantially contain the third and fourth arched body portions. In at least some examples, at least one edge of one or both of the arched body portions may include rounded edges that allow pivotal engagement between the arched body portion(s) and the spring member.

As used in this specification in this context, the term "substantially contain" means that a majority (at least 50%) of the exterior surface area of the body portion is covered by or contained within an area or volume defined by the spring member.

Optionally, in at least some examples of the invention, some parts of the first and second arched body portions may extend through the first spring member, e.g., to provide a peg or other means for engaging with a base or other element and/or to help secure the body portion to the spring member.

Still additional aspects of the invention relate to impact attenuating and spring elements that may include: (a) a first body portion; (b) a second body portion facing the first body portion, wherein an open space is defined between the body portions; (c) a first spring member at least partially included in the open space; and (d) a hinge member connecting the first body portion and the second body portion, wherein the spring member engages a cam portion of the hinge member. In this example, when a force is applied to at least one of the first or second body portions so as to change an orientation of the impact attenuating and spring element, the first spring member exerts a force that urges the element back toward its original orientation. In at least some examples of the invention, the first spring member may extend outside the open space through an area defined between the first body portion and the cam portion of the hinge member. In use, the spring member may slidably move with respect to the first body portion.

Additional aspects of the invention relate to pieces of footwear or other foot-receiving devices that include one or more of the impact attenuating and spring elements described above. Such pieces of footwear or foot-receiving devices may include, inter alia: (a) an upper member; (b) a sole member connected directly or indirectly to the upper member; and (c) at least one impact attenuating and spring element like those described above located between the upper member and the sole member and/or engaged with at least some portion of at least one of the upper member or the sole member. The impact attenuating and spring element(s) may be located in the heel area of the piece of footwear or other foot-receiving device, in the toe area, and/or in any other suitable or desired location without departing from this invention. In some examples, the impact attenuating and spring element(s) will remain visible and exposed, even after assembly of the footwear or foot-receiving device is completed and/or while the footwear or foot-receiving device is in use, although the impact attenuating and spring elements may be enclosed in the structure without departing from the invention.

Still additional aspects of the invention relate to methods for including one or more impact attenuating and spring elements in a piece of footwear or foot-receiving device. Such methods may include, for example: (a) providing an upper member and a sole member for a piece of footwear or foot-receiving device; (b) selecting at least a portion of an impact attenuating and spring element at least in part based on a characteristic of an intended user of the piece of footwear or foot-receiving device or based on a characteristic of an intended use of the piece of footwear or foot-receiving device; and (c) providing at least the portion of the impact attenuating and spring element between the upper member and the sole member of the piece of footwear or foot-receiving device and/or engaging at least the portion of the impact attenuating and spring element with at least one of the upper member or the sole member. The impact attenuating and spring elements or portions thereof may be of the type described above (and described in more detail below).

As more specific examples, the portion of the impact attenuating and spring element may be selected based on one or more characteristics of the intended end user, such as: the user's weight, the user's shoe size, the user's foot width, the user's moving speed or anticipated moving speed, the user's typical gait or stride characteristics (e.g., a pronation or supination tendency), and the like. Also, different impact attenuating and spring elements or portions thereof may be selected depending on the final intended end use of the footwear or foot-receiving device products. For example, different impact attenuating and spring elements or portions thereof (e.g., having different stiffnesses) may be selected depending on whether the product is used for walking, running, basketball, soccer, football, baseball, softball, sprinting, track events, field events, children's games, video games, etc.

The impact attenuating and spring elements or portions thereof also may be selected and/or included as part of the footwear or foot-receiving device structure at any desired location without departing from the invention. For example, the impact attenuating and spring elements or portions thereof may be selected at the assembly factory, and the products then may be marketed in a manner targeted to specific intended user or use characteristics (e.g., the sales box or a tag on the product might indicate that the shoe is designed for running or jogging for a user between 165 and 180 lbs.). As another example, shoe retailers or wholesalers may have a supply of impact attenuating and spring elements or portions thereof to insert into the footwear or foot-receiving device at the point of sale location, e.g., based on the characteristics of the intended user and/or the intended use, to replenish depleted stock, etc. As still another example, users may be allowed to freely select and/or change impact attenuating and spring elements or portions thereof, based on their immediate needs or the characteristics they desire in the footwear or other foot-receiving device (e.g., by switching one impact attenuating and spring element or portion thereof for another at a point of use location, etc.).

Specific examples of the invention are described in more detail below. The reader should understand that these specific examples are set forth merely to illustrate examples of the invention, and they should not be construed as limiting the invention.

C. Specific Examples of the Invention

The various figures in this application illustrate examples of impact attenuating and spring elements useful in systems and methods according to examples of this invention. When the same reference number appears in more than one drawing, that reference number is used consistently in this specification and the drawings to refer to the same or similar parts throughout.

Figure 1B:
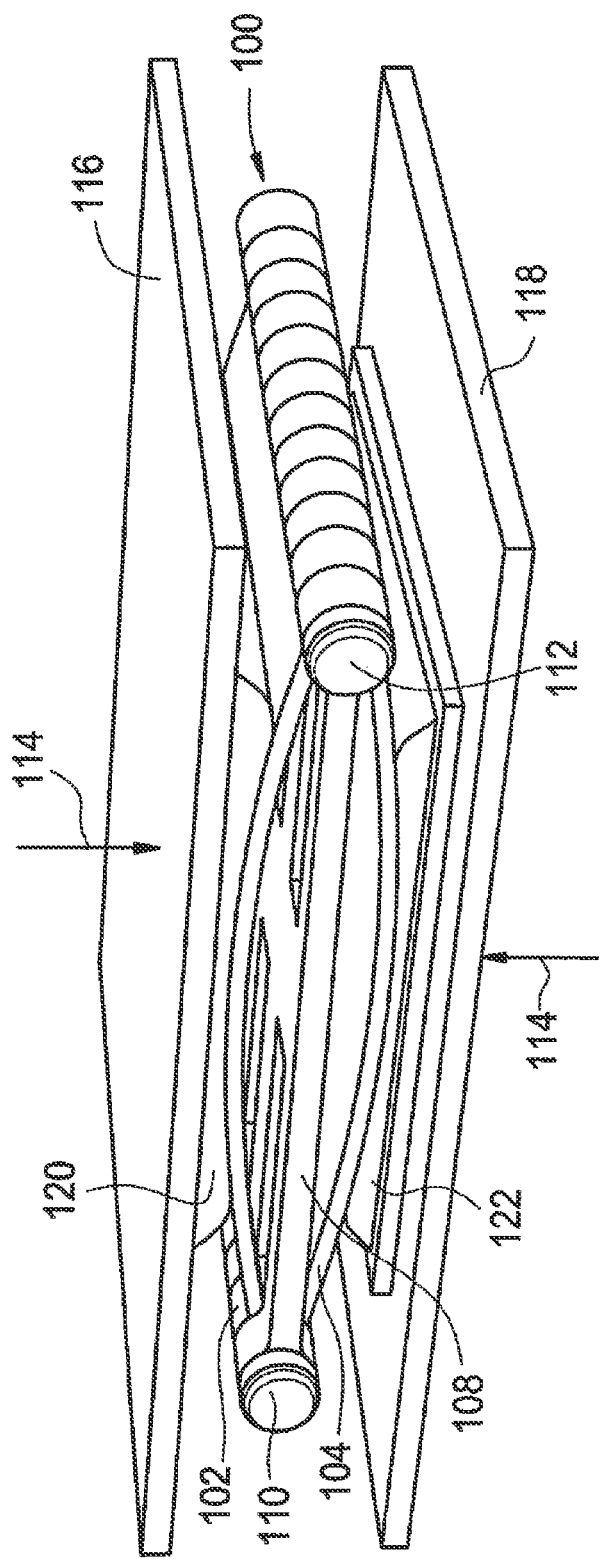

FIGS. 1A and 1B illustrate a first example impact attenuating and spring element or device 100 in accordance with aspects of this invention. This example impact attenuating and spring element 100 (also called a "spring device" in this specification) includes a first body or housing portion or member 102 and a second body or housing portion or member 104, wherein the body members 102 and 104 are arranged facing one another such that an open space 106 is defined between them. The body members 102 and 104 in the illustrated example are arched, semicircular, semi-oval (with a flat or substantially flat top edge), semi-elliptical, hemispherical, etc., in shape so as to provide an area for open space 106, although any suitable shape or orientation may be used without departing from this invention. The body members 102 and 104 may be made from any suitable material, such as plastic, elastomeric, or polymeric materials capable of changing shape, size, and/or orientation when a force is applied thereto and returning back to or toward their original shape, size, and/or orientation when the force is relieved or relaxed. As a more specific example, the body members 102 and 104 (as well as the body portions or members of other examples described in this specification) may be made from a polymeric material, such as PEBAX® (a polyether-block co-polyamide polymer available from Atofina Corporation of Puteaux, France). If desired, a single piece body member may be used that includes body portions that define an open area, or the individual body members 102 and/or 104 each may be constructed from multiple pieces, without departing from this invention.

As illustrated in FIG. 1A, the body members 102 and 104, at least in part, define a base or neutral orientation for the spring device 100 (e.g., an orientation at which no significant external forces are applied to the spring device 100 other than forces applied by the components of the device 100 and/or the components of any device in which it is mounted or housed (such as a piece of footwear or other foot-receiving device)). In other words, in its base or neutral orientation, no external force is applied to the spring device 100 by the user, for example, as a result of walking, running, or jumping (although the spring device 100 may support the user's weight and still be considered as in its neutral or base orientation).

A spring member 108 extends across and is at least partially included in the open space 106. In the base orientation, as illustrated in FIG. 1A, the spring member 108 tautly extends across the open space 106 defined between the body members 102 and 104 at essentially a central location between the body members 102 and 104. In at least some examples of the invention, forces applied to the overall spring device structure 100 by the spring member 108 may be included as part of the forces that define the base or neutral orientation for the spring device 100.

Any suitable or desired spring member 108 design or orientation may be included in the spring device 100 structure without departing from this invention. In this illustrated example, the spring member 108 is a synthetic or natural rubber or polymeric material (such as an elastomeric material) that is capable of stretching under tensile force and then returning (or substantially returning) to or toward its original size and shape when the force is relieved or relaxed. As a more specific example, the spring member 108 (as well as the spring members of other examples described in this specification) may be made from a polymeric material, such as DESMOPAN® (a thermoplastic polyurethane material available from Bayer AG of Leverkusen, Germany). The size, construction, orientation, material, and/or other properties of the spring member 108 may be freely selected and varied to change the overall stiffness and spring constant characteristics of the spring device 100.

The spring member 108 may be engaged with respect to at least one of the body members 102 and/or 104 in a pivotal, rotatable, or hinged manner. In the example illustrated in FIGS. 1A and 1B, the spring member 108 is pivotally connected to both body member 102 and body member 104, at multiple locations, by two pivot shafts 110 and 112 (e.g., the shafts 110 and 112 extend through openings defined along the connecting edges of body member 102, body member 104, and spring member 108). The pivot shafts 110 and 112 may be made of metal, plastic, composites, and/or any other suitable or desired material. In this manner, when a force is applied to at least one of the body members 102 or 104 in a first direction (e.g., a compressive vertical force 114 that tends to reduce at least one dimension of the open space 106) so as to change the spring device 100 from its base orientation (as shown in FIG. 1A) to a compressed or loaded orientation (as shown in FIG. 1B), the spring member 108 will stretch. In other words, the compressive force 114 is attenuated, thereby causing a displacement in another direction (e.g., a horizontal stretch of spring member 108). The spring member 108 may remain stretched while the load 114 is applied. The pivotal or hinged connection allows the body members 102 and 104 and the spring member 108 to more freely move with respect to one another and helps prevent stresses induced by the compressive force 114 from breaking one of the body members 102 or 104 or the spring member 108, particularly at or near their points of connection. When the load 114 is relieved or relaxed, the spring member 108 will return to (or substantially return to) its original size and shape (e.g., see FIG. 1A), which tends to pull the body members 102 and 104 inward, thereby returning the spring device 100 to its original orientation (or at least back toward its original orientation). Material characteristics of the body members 102 and 104 (e.g., their thermoplastic construction in some examples) also may help return the body members 102 and 104 to their original orientation.

Forces may be applied to the spring device 100 in any suitable manner or under any set of circumstances without departing from aspects of this invention. As one more specific example, one or more of the spring devices 100 may be mounted in a piece of footwear or other foot-receiving device (e.g., as part of a midsole or outsole in the heel and/or toe areas of the piece of footwear or other foot-receiving device), and compressive forces 114 (e.g., ground reaction forces) may be applied to the spring device 100 as the user steps down on the footwear or other foot-receiving device (e.g., while stepping, landing from a jump, etc.). Because of the spring back forces applied when spring member 108 returns to its original size, shape, and orientation, the spring device 100 may assist in the user's step or jump rebounding effort, thereby improving or enhancing the user's performance.

FIGS. 1A and 1B further illustrate the spring device 100 mounted or included between two bases or plates 116 and 118, wherein optional flexible interfaces 120 and 122 (such as foam material) are provided between the bases 116 and 118 and the body members 102 and 104 of the spring device 100. These flexible interfaces 120 and 122 may be capable of changing shape when the compressive forces 114 are applied, as shown in FIGS. 1A and 1B.

The bases 116 and 118 and optional flexible interfaces 120 and 122 may form an integral part of a piece of footwear or other device in which the spring device 100 may be mounted or included. Alternatively, the bases 116 and 118 and optional flexible interfaces 120 and 122 may be included as part of the overall spring device 100 and placed in a piece of footwear or other device along with the other elements of the spring device 100 as a unitary construction (e.g., as a "heel cage" unit). The flexible interfaces 120 and 122 may be attached to their respective bases 116 and 118, if desired, and the body members 102 and 104 may be attached to their respective interfaces 120 and 122, if desired, and/or bases 116 and 118, in any suitable manner, such as through a mechanical connection, an adhesive connection, a tight fit, or the like.

The bases 116 and 118 may be made from any desired material without departing from the invention. As a more specific example, the bases 116 and 118 (as well as the bases of other examples described in this specification) may be made from a polymeric material, such as PEBAX® (a polyether-block co-polyamide polymer available from Atofina Corporation of Puteaux, France). The flexible interfaces 120 and 122 also may be made from any suitable or desired material, such as a commercially available synthetic foam rubber material or the like.

While the specific example illustrated in FIGS. 1A and 1B includes shafts 110 and 112 to allow rotational or pivotal movement of the body members 102 and 104, e.g., with respect to spring member 108 and with respect to one another, other arrangements are possible that do not require the use of shafts 110 and 112. Additionally, while the structure shown in FIGS. 1A and 1B is made up of multiple independent pieces, more unitary and/or one-piece constructions for at least portions of the impact attenuating devices 100 are possible without departing from the invention. Some examples of such arrangements and structures are described in more detail below.

Figure 2A:
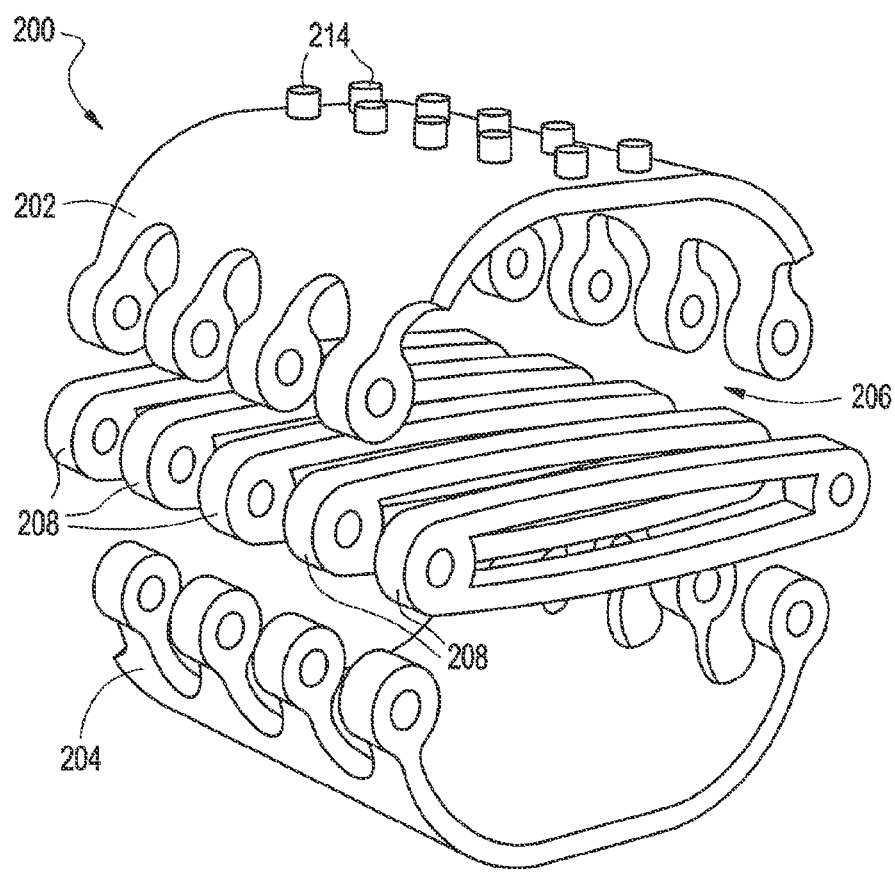
FIGS. 2A through 2C illustrate another example impact attenuating and spring element in accordance with aspects of this invention.
Figure 2B:
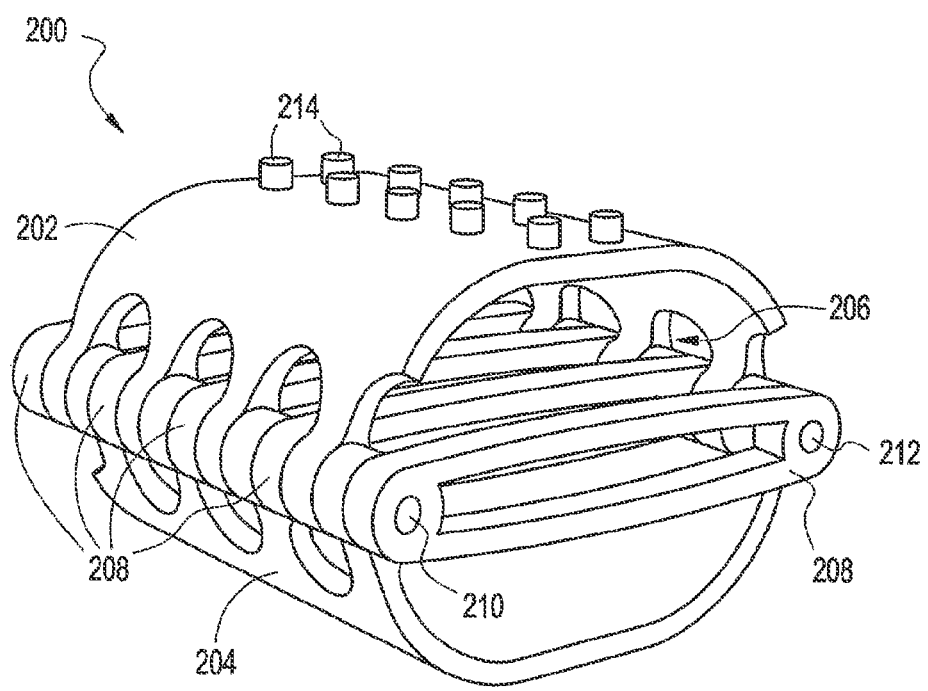
Figure 2C:
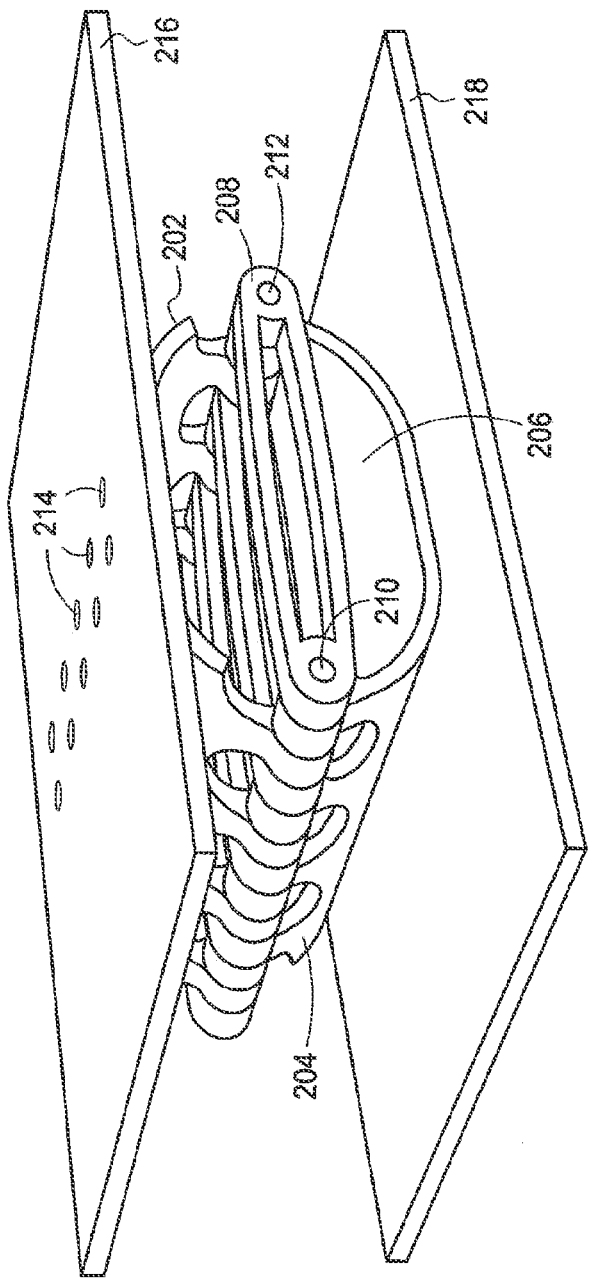

FIGS. 2A through 2C illustrate another example of a spring device 200 in accordance with aspects of this invention that includes additional or alternative potential features or structures. As illustrated in FIG. 2A, the spring device 200 includes a first body portion or member 202 and a second body portion or member 204 shaped and oriented so as to face one another and to provide an open area 206 therebetween. In this example, the body members 202 and 204 are more semi-oval or semi-elliptical shaped in their base orientation as compared to the body members 102 and 104 of FIGS. 1A and 1B. Also, in this example, plural independent spring members 208 are provided and extend across the open area 206 at a central location between the body members 202 and 204. The spring members 208 are pivotally or hingedly mounted with respect to both body members 202 and 204 along their respective connecting edges by shafts 210 and 212 in a manner similar to that illustrated in FIGS. 1A and 1B. Additionally, when a compressive force is applied to the body members 202 and 204, the spring device 200 and spring members 208 operate in a similar manner to spring device 100 and spring member 108 described above.

While not a requirement, all of the spring members 208 in this example are identically shaped and sized, although different shapes, sizes, strengths, and materials may be used for the individual spring members 208 without departing from the invention. Additionally, although FIGS. 2A and 2B illustrate all of the spring members 208 arranged in parallel, in a common plane across essentially the center of the spring device 200, any suitable or desired arrangement or orientation of the spring members 208 may be used without departing from this invention, including arrangements in different planes and/or in a non-parallel manner. Again, the size, construction, orientation, material, and/or other properties of the various individual spring members 208 may be freely selected and varied to change the overall stiffness and spring constant characteristics of the spring device 200. Additionally, if desired, one or more spring members 208 may be used in combination with spring members of other sizes, constructions, orientations, materials, and/or other properties without departing from the invention.

Additional features available in accordance with at least some examples of this invention are illustrated in FIGS. 2A through 2C. For example, each of the body members 202 and 204 in this illustrated example include mountings members 214. These mounting members 214 (e.g., pins 214 in the illustrated example) may be used to fix the locations of the body members 202 and 204 with respect to base members 216 and 218, as illustrated in FIG. 2C. Optionally, an adhesive or cement, e.g., on mounting members 214, on base members 216 and 218, and/or on body members 202 and 204, may be used to further secure the body members 202 and 204 to their respective base member 216 and 218, if desired. The base members 216 and 218 may form an integral part of the spring device 200, or alternatively, they may form a part of a device that will contain the spring device 200 (such as a piece of footwear or other foot-receiving device) without departing from the invention. Additionally, while the mounting pins 214 are shown as round pegs in FIGS. 2A through 2C, any suitable or desired structure, position, shape, or size for the attachment elements may be used without departing from the invention. For example, the outer surface of the body members 202 and 204 may include one or more raised ribs that fit into slots, tracks, or openings formed in the base members 216 and 218, and vice versa.

Additionally or alternatively, pins or ribs 214 of the type described above also may be used to control and/or fine tune the stiffness of the overall spring device. For example, providing ribs or pins as described above may stiffen the body members somewhat while adding less overall weight to the spring devices as compared to making the entire body members thicker in an effort to provide additional stiffness.

Figure 3:
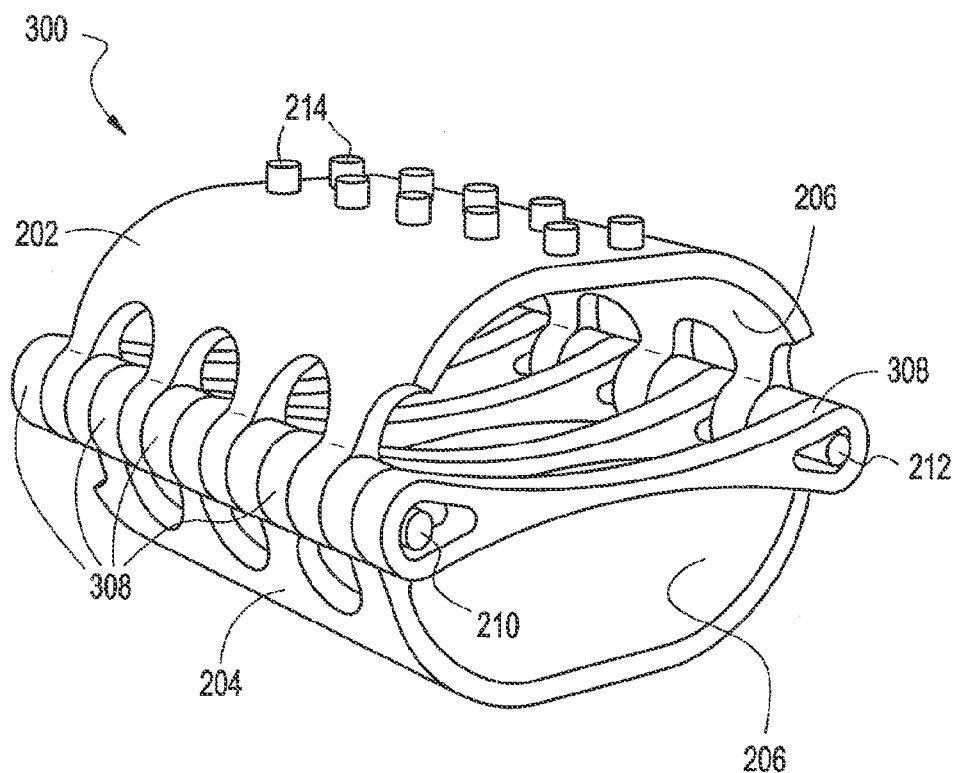
FIG. 3 illustrates another example impact attenuating and spring element in accordance with aspects of this invention.

FIG. 3 illustrates another example spring device 300 that includes aspects of the present invention. Because the example spring device 300 is quite similar structurally to the example spring device 200 illustrated in FIGS. 2A through 2C, where applicable, the same reference numbers are used in FIG. 3 as are used in FIGS. 2A through 2C. In this example structure 300, however, the spring members 308 are somewhat differently shaped and styled as compared to those illustrated in FIGS. 2A through 2C. More specifically, in this example, the spring members 308 are essentially solid bands of elastomeric material with openings at each end to accommodate the shafts 210 and 212, rather than the more open band structures shown in FIGS. 2A through 2C. Again, the position, size, construction, orientation, material, and/or other properties of the various spring members 308 may be freely selected and varied to change the overall stiffness and spring constant characteristics of the spring device 300. Additionally, if desired, one or more spring members 308 may be used in combination with spring members of other sizes, constructions, orientations, materials, and/or other properties without departing from the invention.

Figure 4A:
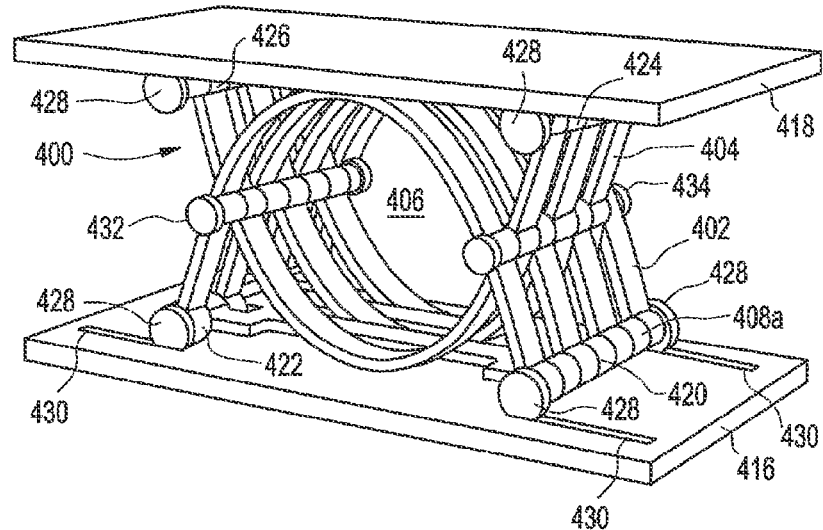
FIGS. 4A and 4B illustrate another example impact attenuating and spring element in accordance with aspects of this invention.
Figure 4B:
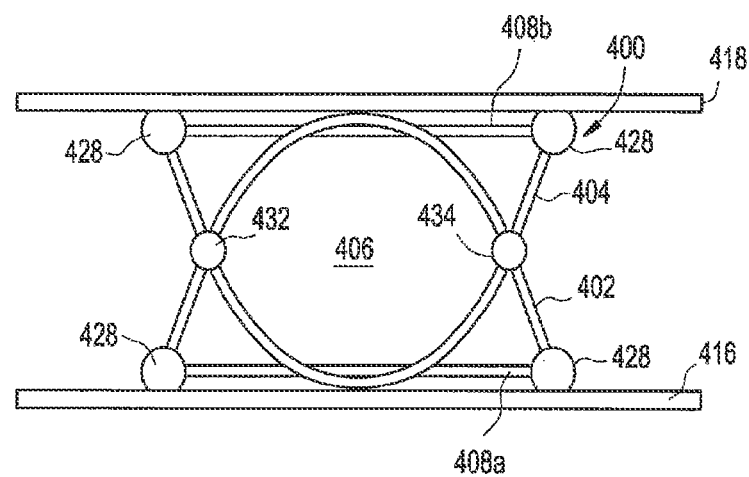

FIGS. 4A and 4B illustrate another example of a spring device 400 in accordance with aspects of this invention. In this example, the body members of the spring device 400 are arranged somewhat differently from those described above. Specifically, in this example, each body portion or member 402 and 404 is semicircular, semi-oval, or semi-elliptical shaped and extends the entire distance between the base members 416 and 418 (in the examples of FIGS. 1A through 3, each body portion or member spanned only one half of that distance). Moreover, in this example, each spring device 400 includes a plurality of independent body members 402 and 404 oriented in parallel in each direction.

An open space 406 is defined between the various body portions or members 402 and 404, and spring members 408*a* and 408*b* extend through this open space 406. Spring member 408*a* is pivotally or hingedly engaged with respect to body member(s) 402 via shafts 420 and 422 and extends through the open area 406 at a location proximate to base member 416. Similarly, spring member 408*b* is pivotally or hingedly engaged with respect to body member(s) 404 via shafts 424 and 426 and extends through the open area 406 at a location proximate to base member 418. The ends of shafts 420, 422, 424, and 426 may include slide wheels 428 that engage tracks 430 in plates 416 and 418. Furthermore, the base members 402 and 404 may be pivotally or hingedly engaged with respect to one another via shaft members 432 and 434.

When a compressive force is applied to plates 416 and/or 418 (e.g., in a vertical direction), this causes the body members 402 and 404 to flatten out (e.g., displace in a horizontal direction) as the slide wheels 428 slide away from one another along tracks 430. This compressive force also causes the spring members 408*a* and 408*b* to stretch. When the compressive force is relaxed or relieved, the stretched spring members 408*a* and 408*b* will return toward their original orientation, thereby pulling the attached base members 402 and 404 with them and returning the spring device 400 back toward its original orientation.

Of course, various alternatives are possible to the construction illustrated in FIGS. 4A and 4B. For example, while the spring device 400 includes plural body portions or members 402 and 404 oriented in parallel in each direction, each parallel set of the body members 402 and 404 could be made of a one piece construction, if desired. Additionally, while FIGS. 4A and 4B illustrate each spring member 408a and 408b as a one piece construction, plural spring members may be used without departing from the invention. As potential additional alternatives, spring members 408a and/or 408b may be arranged outside of body members 404 and 402, respectively, such that they do not pass through the open area 406, particularly if body members 402 and 404 are formed as a single piece. The various components of the spring device 400 may be made of any suitable or desired materials, like the various materials for similar elements described above. Other variations on the structure, size, construction, position, and/or orientation of the various components of the spring device 400 are possible without departing from the invention, and the spring device 400 also may include one or more of the various features of the other example embodiments described above without departing from the invention.

Figure 5A:
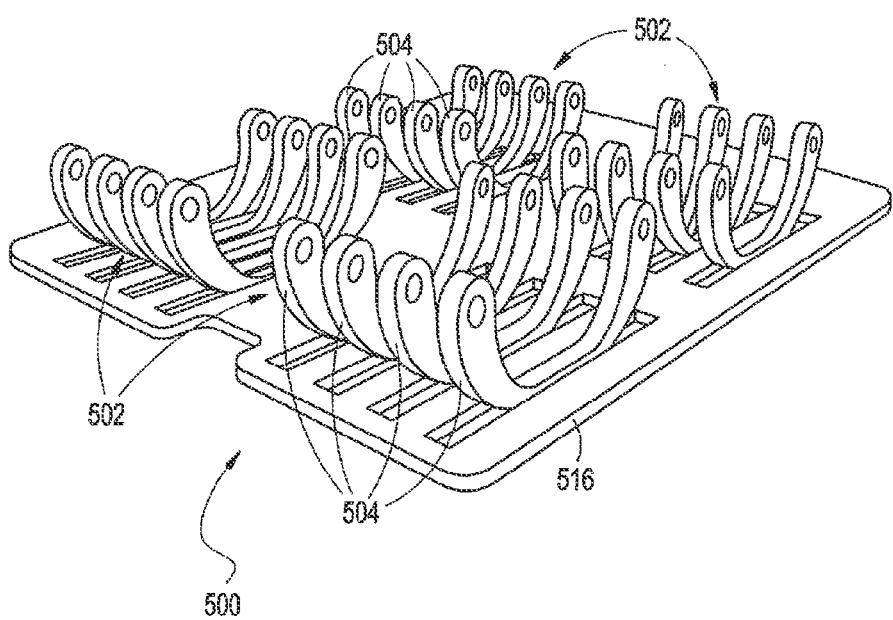
FIGS. 5A through 5C illustrate an example impact attenuating and spring element/base member structure in accordance with aspects of this invention.
Figure 5B:
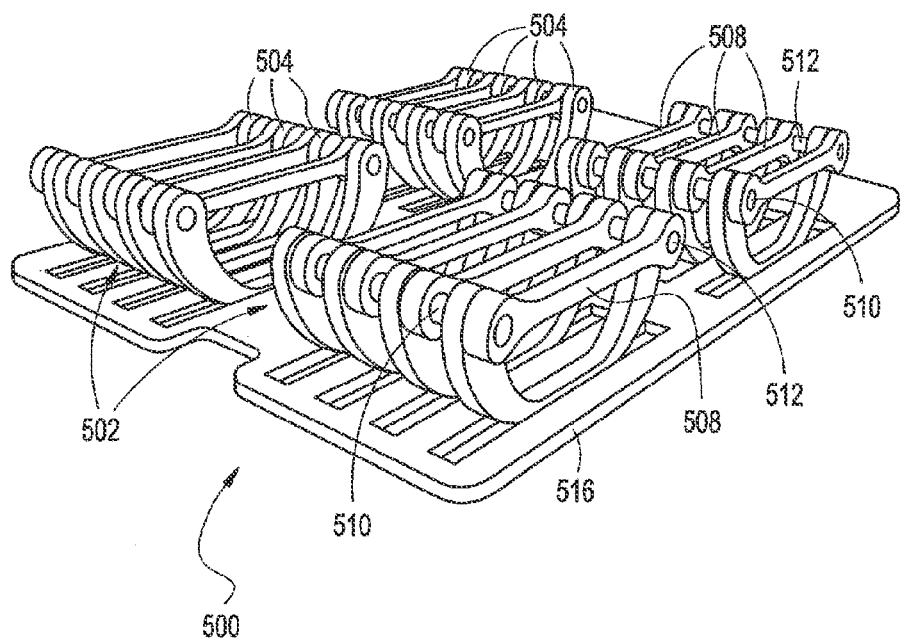
Figure 5C:
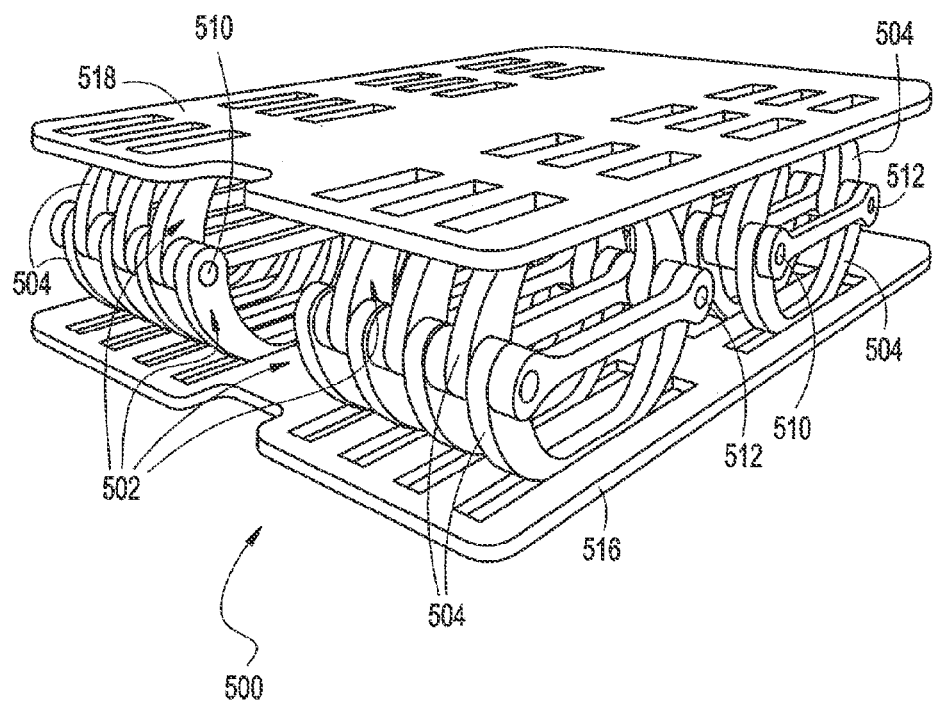

FIGS. 5A through 5C illustrate another example spring device 500 made in accordance with aspects of the present invention. As shown in FIG. 5A, the spring device 500 includes a single base member 516 from which four spring device portions 502 extend. Each spring device portion 502 optionally may include plural spring body portions or members 504. While not a requirement, the base member 516 and the spring device portions 502 may be made from a single piece of material, such as plastic, polymeric, or elastomeric materials, including those materials described above.

FIG. 5B additionally illustrates the presence of spring members 508 connected between the ends of the spring device portions 502 on shafts 510 and 512. Any desired spring member 508 construction(s) may be used without departing from the invention. For example, while the illustrated example in FIG. 5B shows multiple spring members 508 in each spring device portion 502, one spring member 508 between each adjacent pair of spring body portions or members 504, as an alternative, a single spring member may be provided for one or more device portions 502 without departing from the invention. Any desired number of spring members 508 may be used in the spring device portions 502, and a single spring member 508 may span two or more spring device portions 502, without departing from the invention.

FIG. 5C illustrates a completed spring device 500 in which a second base member 518 having its own set of spring device portions 502 and spring body portions or members 504 is connected with the first base member 516 in a pivotal or hinged manner. Specifically, the shafts 510 and 512 run through the connecting ends of the spring body portions or members 504 and the connecting ends of spring members 508 to pivotally or hingedly engage these members with respect to one another. The entire spring device 500 may be incorporated into any desired device, such as in the heel portion of a piece of footwear, a heel cage member for inclusion in a piece of footwear or a foot-receiving device, or the like. The spring device 500 may be used and operated in the same general manner described above in conjunction with the other examples.

Another example spring device 600 including aspects of the present invention is illustrated in FIGS. 6A through 6C. As shown in FIG. 6A, the spring device 600 includes two body portions or members 602 and 604 with a spring member 608 included within the open space 606 defined between the body members 602 and 604. Plural hinge members 610 are provided around the periphery of the spring device 600 to pivotally or hingedly engage the spring member 608 with respect to the body members 602 and 604.

The spring member 608 and hinge members 610 are illustrated in more detail in FIGS. 6B and 6C. As shown, the spring member 608 includes a plurality of arms 608a through 608f that extend outward from a central area 612 toward the various hinge members 610. The ends of the arms 608a through 608f include an open portion for receiving pivot shafts 614, which pivotally connect the spring member 608 to the hinge members 610. Each hinge member 610 includes one or more hinge elements 616 that pivotally connect the hinge member 610 and the spring member 608 to the body member 602. Additionally, each hinge member 610 includes one or more hinge elements 618 that pivotally connect the hinge member 610 and the spring member 608 to the body member 604. Access holes 620 allow insertion of pivot shafts into body members 602 and 604 and through hinge elements 616 and 618 (see FIG. 6A).

When a compression force acts on body members 602 and 604 (e.g., in the vertical direction), this action compresses the body members 602 and 604 together, which in turn closes the hinge members 610 and forces the shafts 614 outward, thereby stretching the arms 610a through 610f of the spring member 608 (e.g., horizontal displacement of arms 610a through 610f in response to the vertical force). When the force is relaxed or relieved, the arms 610a through 610f compress or retract back toward their original position and orientation, which in turn pulls the shafts 614 of the hinge members 610 inward, opening the hinge member 610 and urging the body members 602 and 604 back toward their original orientation.

Figure 7A:
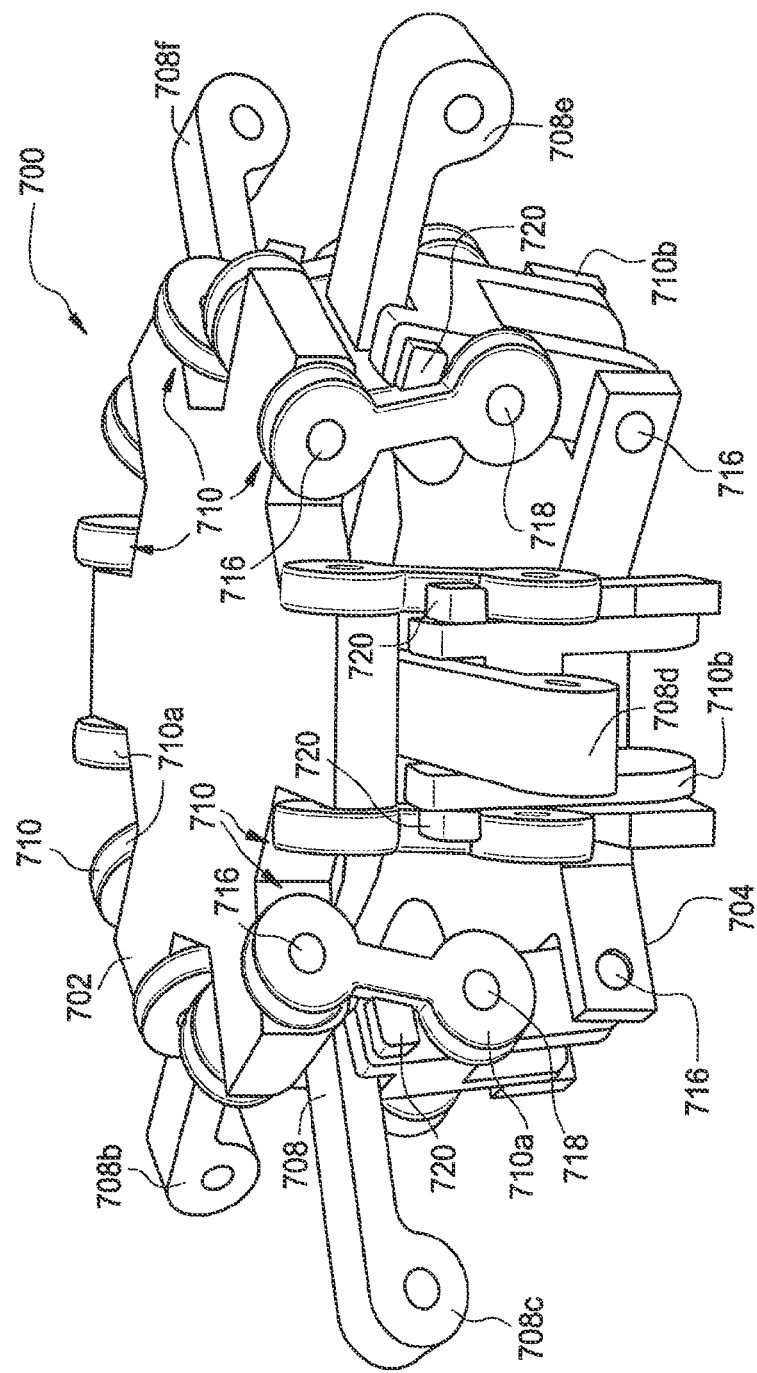
FIGS. 7A through 7D illustrate another example impact attenuating and spring element with separate hinge members and cam action in accordance with aspects of this invention.
Figure 7B:
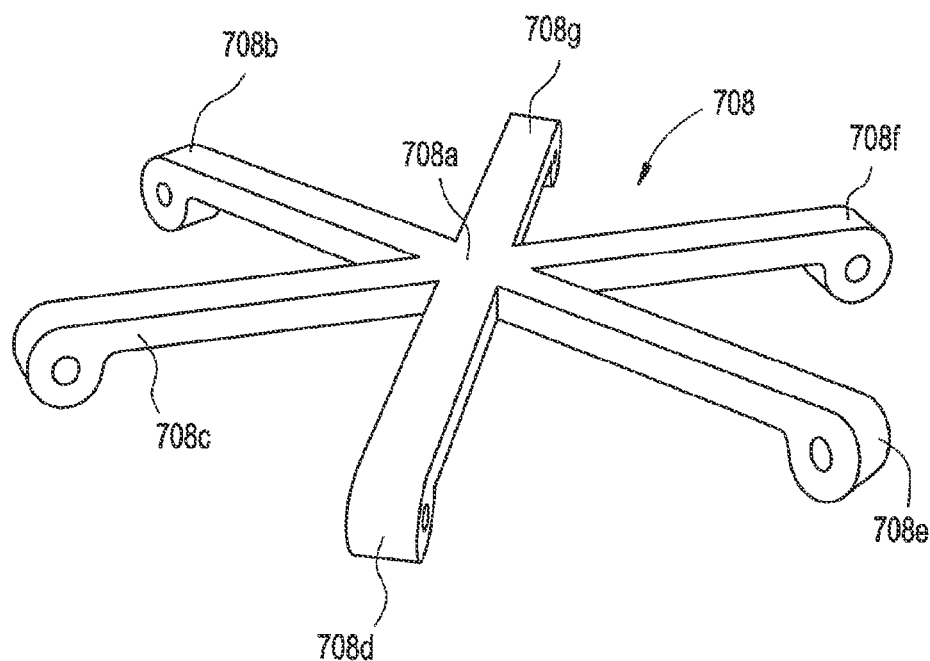

FIGS. 7A through 7D illustrate another example of a spring device 700 in accordance with at least some aspects of the present invention. In this spring device 700, two spring body portions or members 702 and 704 define an open area 706 therebetween, and a spring member 708 is partially provided within this open area 706. An example spring member 708 for use in this example spring device 700 is illustrated in more detail in FIG. 7B, which shows the spring member 708 as including a central or hub area 708a and six arms 708b through 708g extending outward therefrom (the spring member 708 is not shown in FIGS. 7C and 7D to avoid obscuring various features in these drawings). As illustrated in FIG. 7A, the arms 708b through 708g of the spring member 708 partially extend outside of the open space 706 defined between the body members 702 and 704.

The body members 702 and 704 are pivotally connected to one another via cam or hinge members 710. The arms 708b through 708g of the spring member 708 extend outside of the open space 706 through a space 712 defined between the body member 702 and a cam portion 714 of the cam or hinge members 710 (see FIGS. 7C and 7D). The presence of the spring member 708 in the space 712 (and a reasonably tight fit therein) may, at least in part, help hold the body members 702 and 704 at the more separated position shown in FIGS. 7A, 7C, and 7D. The enlarged ends of arms 708b through 708g prevent the arms 708b through 708g from completely pulling back inside of the open space 706.

The cam or hinge members 710 in this example are pivotally connected to each body portion 702 and 704 via pivotable shafts 716. Moreover, the cam or hinge members 710 of this example are comprised of three independent parts, namely two cam or hinge elements 710a (which pivotally attach to body member 702) and cam or hinge element 710b (which pivotally attaches to body member 704). The cam or hinge elements 710a and 710b are pivotally attached to one another via one or more shafts 718.

Figure 7C:
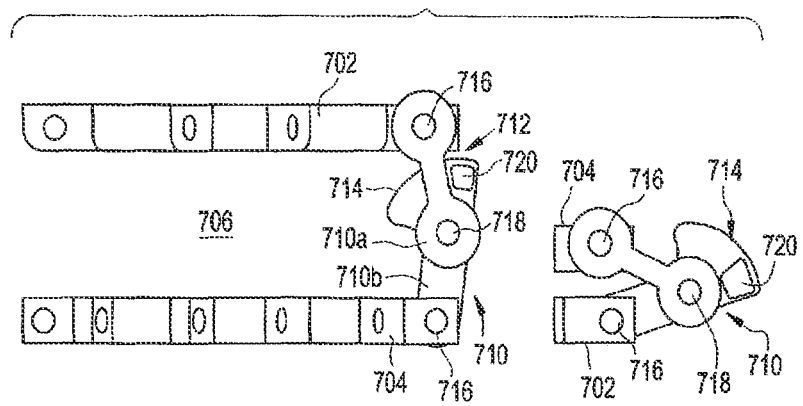
Figure 7D:
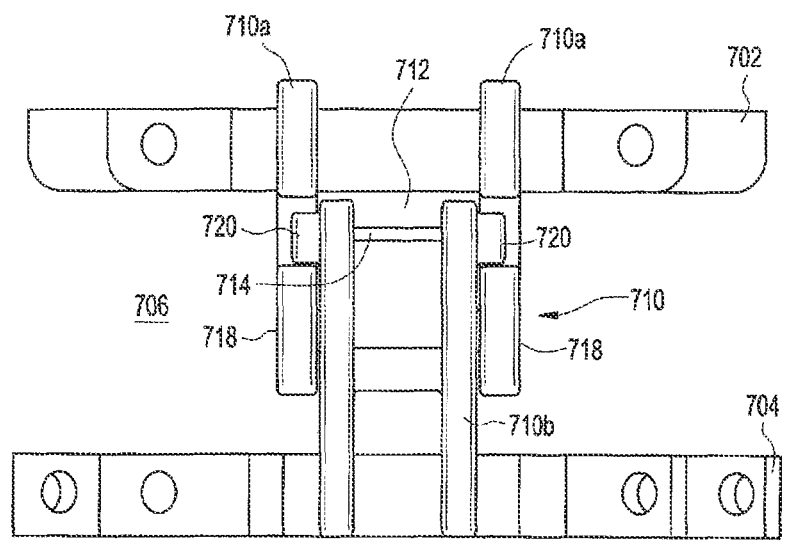

In use, a compressive force (e.g., in a vertical direction or having a vertical component) acts on body members 702 and 704, which attempts to compress the open area 706 between these body members as illustrated in the right hand side of FIG. 7C. This action reduces the size of the space 712 between the body member 702 and the cam portion 714 and pinches the arms 708b through 708g of the spring member 708 between the body member 702 and the cam portion 714 of the cam or hinge member 710. As the compressive forces further push the body members 702 and 704 together, the curved cam portion 714 rotates or pivots with respect to the respective arm of the spring member 708, thereby stretching the arms 708b through 708g of the spring member 708 and pushing them outside of the open space 706 (e.g., horizontal displacement of the spring arms). When the force on body members 702 and 704 is relaxed or relieved, the spring member 708 will exert a reverse force as it snaps back toward its original orientation, thereby pivoting and pulling the cam or hinge members 710 back toward their original orientation. If desired, stop members 720 can be provided, e.g., as part of the structure of hinge element 710b or 710a, to prevent over-rotation of hinge element 710b with respect to hinge element 710a.

Various different materials and configurations for the spring device 700 components may be used without departing from the invention. As one example, selecting the spring member 708 configuration and material and the cam portion 714 configuration and material so as to have a relatively high frictional engagement as compared to the engagement between the body member 702 and the spring member 708 may allow the cam portion 714 to better stretch out the spring member 708 while the spring member arms 708b through 708g slide out of the open area 706.

Figure 8A:
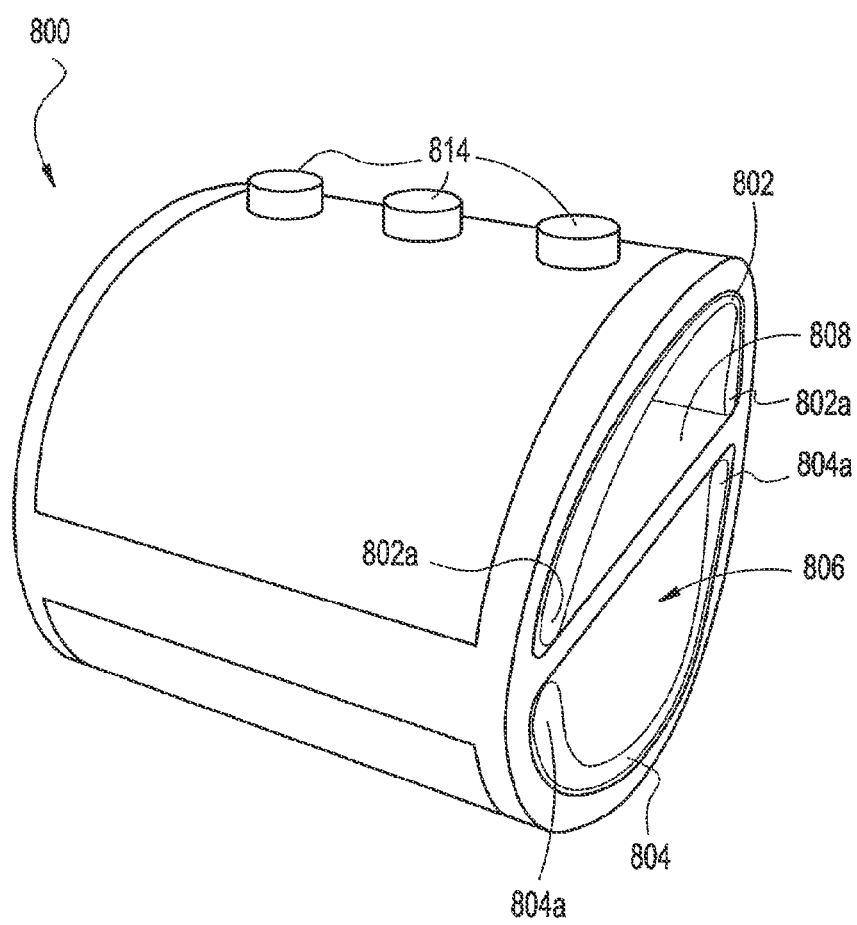
FIGS. 8A through 8C illustrate an example impact attenuating and spring element with a spring member that at least partially encloses the body portions of the element in accordance with aspects of this invention.
Figure 8B:
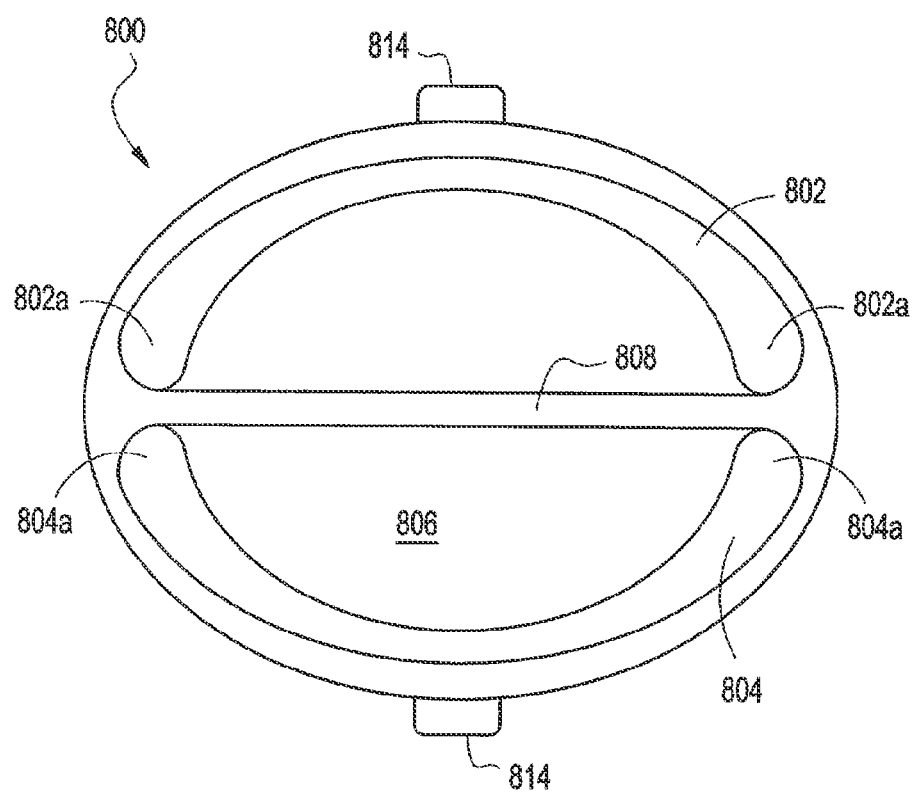
Figure 8C:
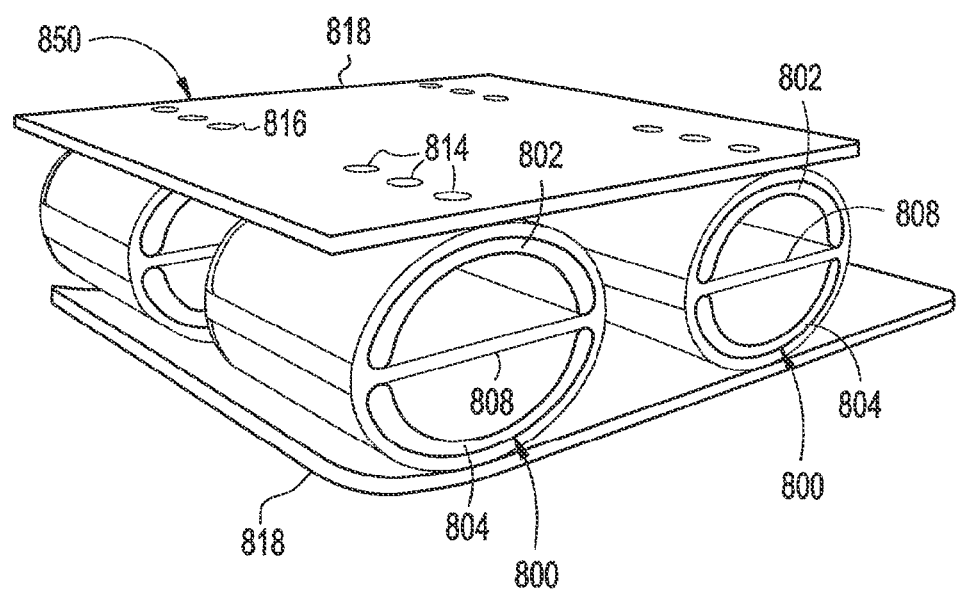

Another example spring device 800 according to aspects of the present invention is illustrated in FIGS. 8A through 8C. In this example, arched body portions or members 802 and 804 are arranged facing one another such that an open space 806 is defined therebetween. A stretchable spring member 808 extends through the open space 806 and pivotally engages the rounded ends 802a and 804a of the body members 802 and 804, respectively. The spring member 808 further extends outside the open space 806 and around the exterior surfaces of the body members 802 and 804 so as to at least substantially enclose the body members (e.g., enclose or cover at least 50% of the outer surface area of body members 802 and 804). In the illustrated example, the spring member 808 encloses substantially all of the exterior surface of body members 802 and 804. This example spring device 800 is advantageous in that it eliminates the need for separate pivot shafts, hinges, and/or cam members in the spring device structure.

In use, when a force is applied that compresses body members 802 and 804 toward one another, the rounded ends 802a and 804a of these body members 802 and 804 pinch together and pivot with respect to the spring member 808, which stretches the spring member 808 outward under the force of the pinching and flattening body members 802 and 804. When the compressive force is relieved or relaxed, the spring member 808 tends to constrict back toward its original orientation and configuration, thereby pulling body members 802 and 804 (as well as spring device 800) back toward their original orientation and configuration.

The spring member 808 in the illustrated example includes holes defined therein so that mounting elements 814, e.g., pins 814, included on the exterior surface of the body portions or members 802 and 804 may extend through the spring member and may be used to fix the position of the spring device 800. For example, as illustrated in FIG. 8C, mounting elements 814 may fit into holes 816 defined in base members 818 so that the spring device 800 can be securely mounted between the base members 818. As further illustrated in FIG. 8C, one or more spring devices 800 may be mounted between a set of base members 818 to provide a spring system 850 that may be inserted as a unit (e.g., a "heel cage unit") into another device, such as into a heel area or other area of a piece of footwear or a foot-receiving device.

Rather than being included as part of the body members 802 and 804, the mounting elements 814, if any, may be formed as part of the spring member 808 and/or they may be separate elements attached to the spring member 808 and/or the body members 802 and 804 in some manner. Additionally, the mounting elements 814 may be constructed of any suitable or desired material, in any desired shape, and/or provided at any desired location, without departing from the invention. For example, as noted above, the mounting elements 814 may be formed as ribs that are received in tracks, grooves, or openings defined in base members 818, and vice versa.

Figure 9A:
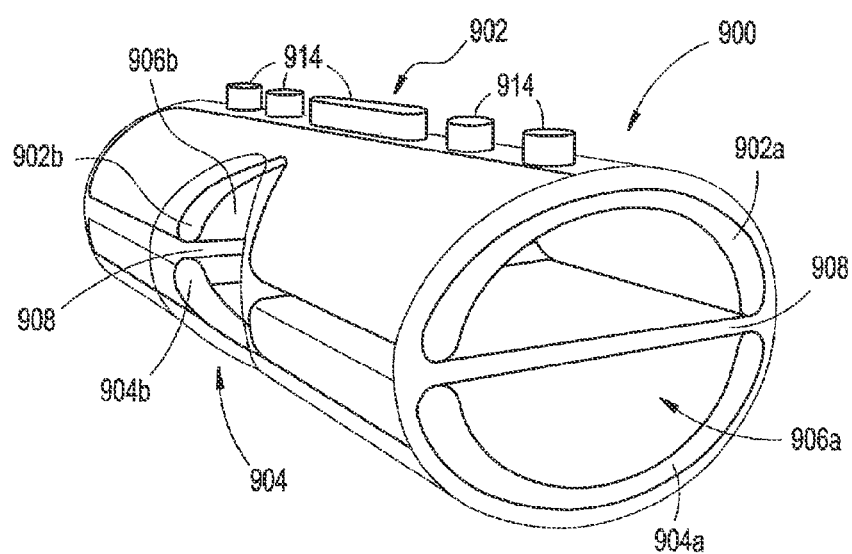
Figure 9C:
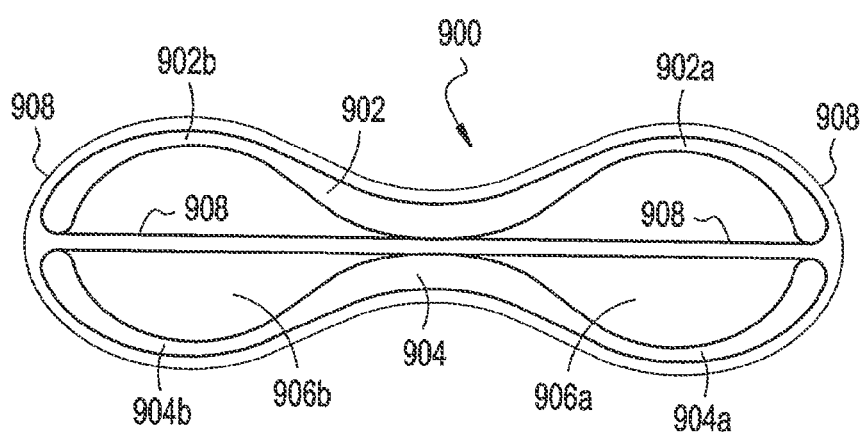

FIGS. 9A through 9C illustrate another example spring device 900 of the general type illustrated in FIGS. 8A through 8C. In this example, a first arched body portion or member 902 provides two separate spring body areas 902a and 902b, and a second arched body portion or member 904 provides two separate spring body areas 904a and 904b. A single spring member 908 extends through the open spaces 906a and 906b defined between the spring body areas 902a, 902b, 904a, and 904b. Plural mounting elements 914 of various sizes and shapes are provided as part of the body members 902 and 904, although, as described above in conjunction with FIG. 8C, the mounting elements 914 may be provided as part of the spring member 908, as a separate attached element, or not at all without departing from the invention. The example spring device 900 of FIGS. 9A through 9C may be used and operated in essentially the same manner as the example spring device 800 illustrated in FIGS. 8A through 8C, as well as the other spring devices described above.

In the example illustrated in FIGS. 9A through 9C, a single spring member 908 extends through the open space 906a and 906b defined between the spring body areas 902a, 902b, 904a, and 904b and around the exterior surfaces of the body members 902 and 904. Alternatively, if desired, each open space 906a and 906b could include a separate spring member 908 or multiple spring members 908 for just that area. As another alternative, a single spring member 908 could extend to at least substantially cover or enclose two completely independent sets of spring body portions or members (e.g., spring body areas 902a and 902b and/or spring body areas 904a and 904b need not be formed from a single piece of material, but could be formed from completely independent pieces of material). Other variations in the structure and construction of the spring member, body members, and/or other portions of the spring device 900 are possible without departing from the invention.

Figure 10A:
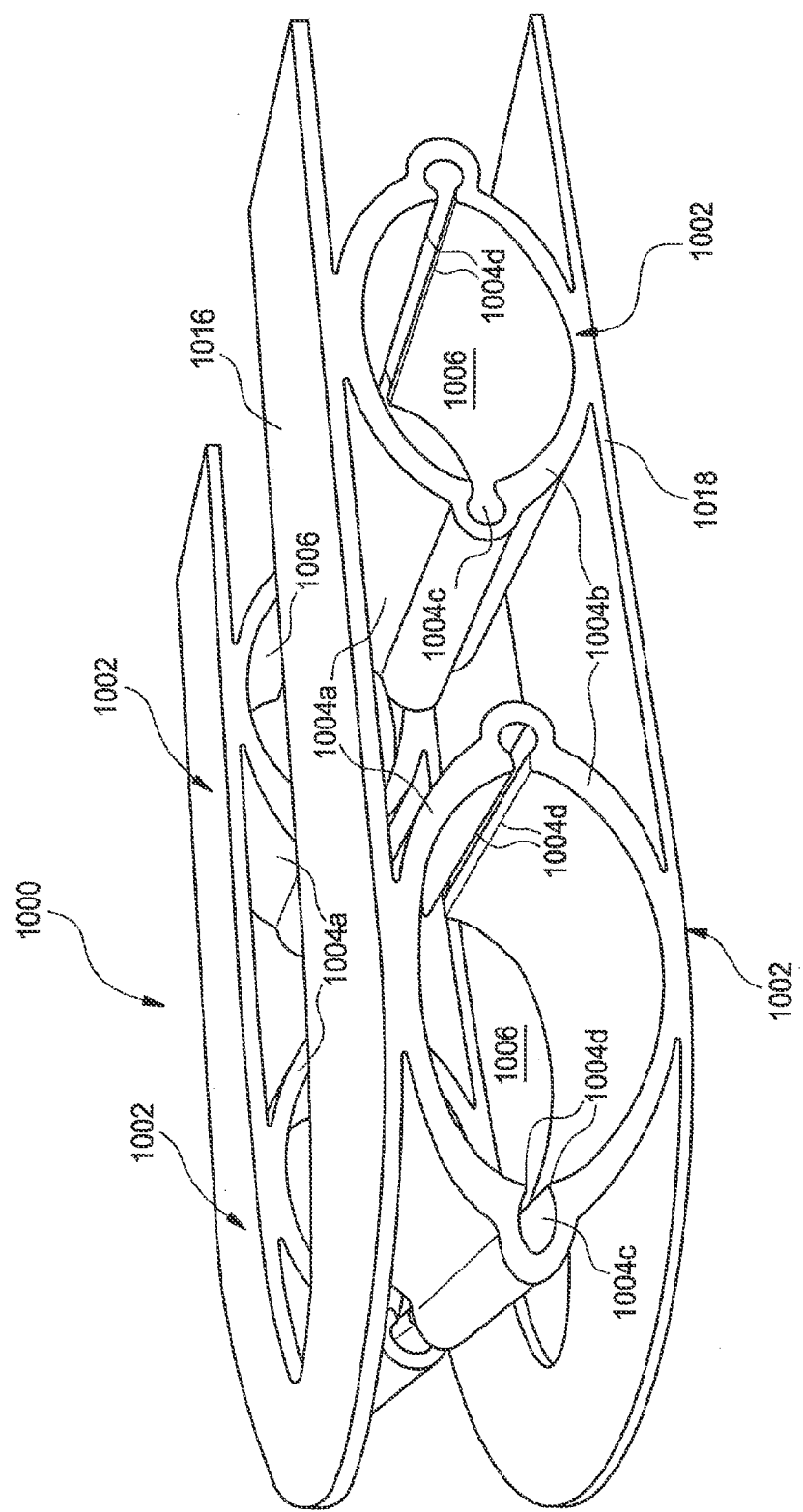
FIGS. 10A and 10B illustrate another example impact attenuating and spring element in accordance with aspects of this invention.
Figure 10B:
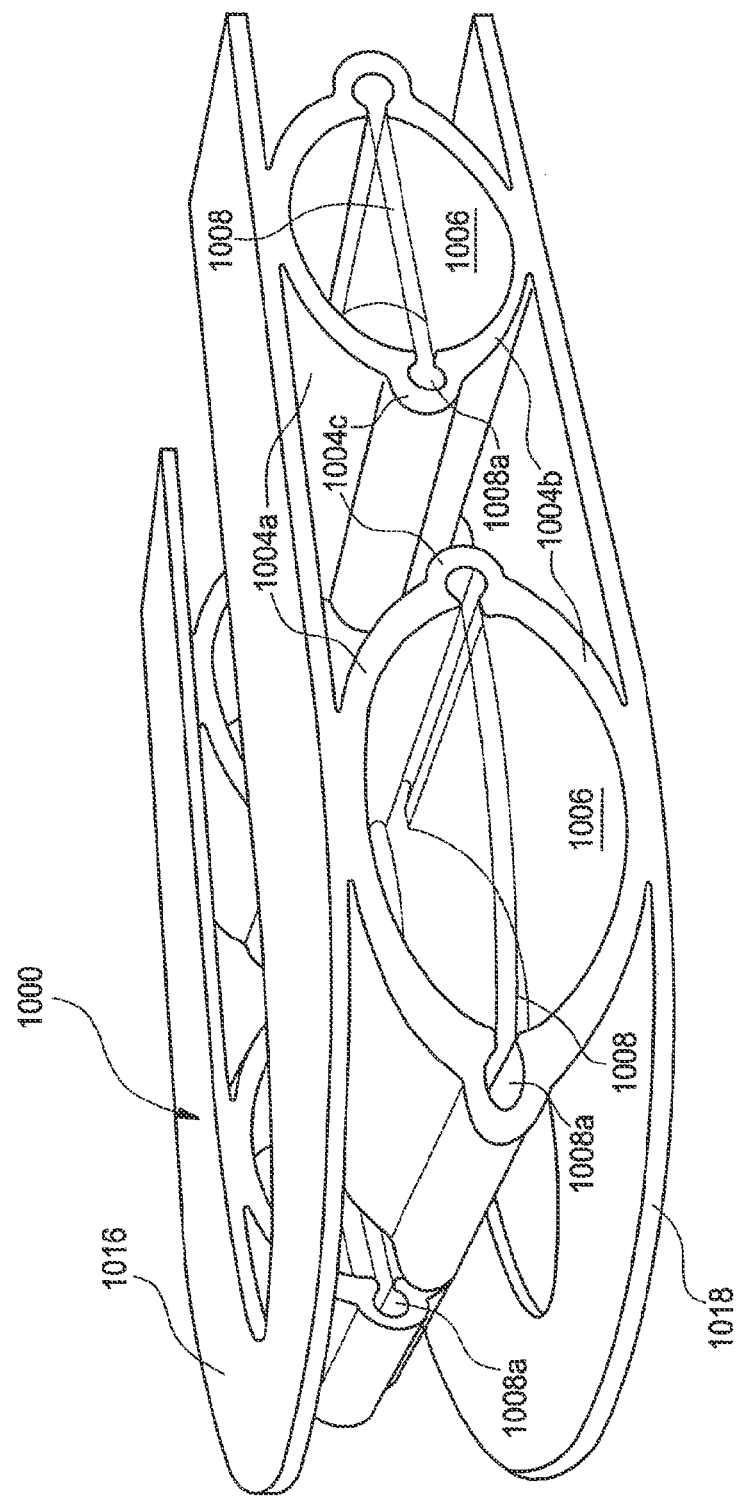

In various impact attenuating and spring element examples described above, the body portions of the impact attenuating elements were made from individual and independent pieces of material. Note, for example, body portions 102, 104, 202, 204, 402, 404, 504, 602, 604, 702, 704, 802, and 804 above. This is not a requirement. FIGS. 10A and 10B illustrate an example impact attenuating and spring element system 1000 including four individual spring element areas 1002. Each spring element area 1002 includes an upper body portion 1004a and a lower body portion 1004b, arranged facing one another such that an open space 1006 is defined between the body portions 1004a and 1004b. In this example, as shown, the body portions 1004a and 1004b are formed as a single piece, unitary construction. Furthermore, in the illustrated example, four spring element areas 1002 are provided between base members 1016 and 1018 to provide a unitary construction that may be fit into a piece of footwear, another foot-receiving device, and/or any other desired device. The spring element areas 1002 may be fixed with the base members 1016 and 1018 in any desired manner without departing from the invention, for example, by cements, by adhesives, by unitary one-piece construction, by mounting pegs or ribs, etc.

FIG. 10B further illustrates the spring element system 1000 of FIG. 10A with spring members 1008 extending across the open spaces 1006 between the body portions 1004*a* and 1004*b*. As shown, these example spring members 1008 include expanded ends or bulbs 1008*a* that fit into corresponding recesses 1004*c* defined by the body portions 1004*a* and 1004*b*. Additionally, in at least some examples, the openings to the recesses 1004*c* will define rounded edges 1004*d*.

In use, when a compressing force acts to compress the open area 1006 between the body portions 1004*a* and 1004*b* (e.g., tending to flatten the spring element areas 1002), the rounded edges 1004*d* will pinch together on the spring member 1008 and pivot somewhat with respect to the spring member 1008. This pivoting and pinching action while the spring element areas 1002 flatten acts to stretch the spring member 1008 in the open area 1006 between the recesses 1004*c*. Then, as the force is relieved or relaxed, the spring member 1008 will return to its original or to substantially its original size, shape, and orientation. As the spring member 1008 contracts toward its original size, shape, and orientation, the expanded ends or bulbed areas 1008*a* of the spring member 1008 will pull back on the edges 1004*d* of the body portions 1004*a* and 1004*b*, to thereby help return the entire spring element areas 1002 back toward their original size, shape, and orientation.

The impact attenuating and spring element arrangements illustrated in FIGS. 10A and 10B are advantageous because the body portions 1004*a* and 1004*b* of the spring element areas 1002 may be made from a one piece construction, and the design eliminates the need for separate hinge, pin, or shaft elements. Nonetheless, the spring members 1008 may be sized with respect to the remainder of the spring element body (e.g., body portions 1004*c*) so that the spring member 1008 may be removed and replaced, if desired, for example, to customize for intended use and/or user characteristics, as described in more detail below, to replace a broken spring member 1008, etc. Of course, a spring element device according to this example of the invention may include one, two, or any number of spring element areas 1002 or individual spring elements without departing from the invention.

As noted above, the various impact attenuating and spring elements and the parts thereof may be made from any suitable or desired materials without departing from the invention, including the various specific examples of materials noted above. Also, the various parts of the impact attenuating and spring elements of the above examples may be made in any desired manner without departing from the invention, including in conventional manners known in the art. For example, if desired, the various spring body portions or members, spring members, hinge members, etc., may be made from plastic materials using conventional techniques, including injection molding techniques and/or other molding techniques, without departing from the invention.

Figure 11:
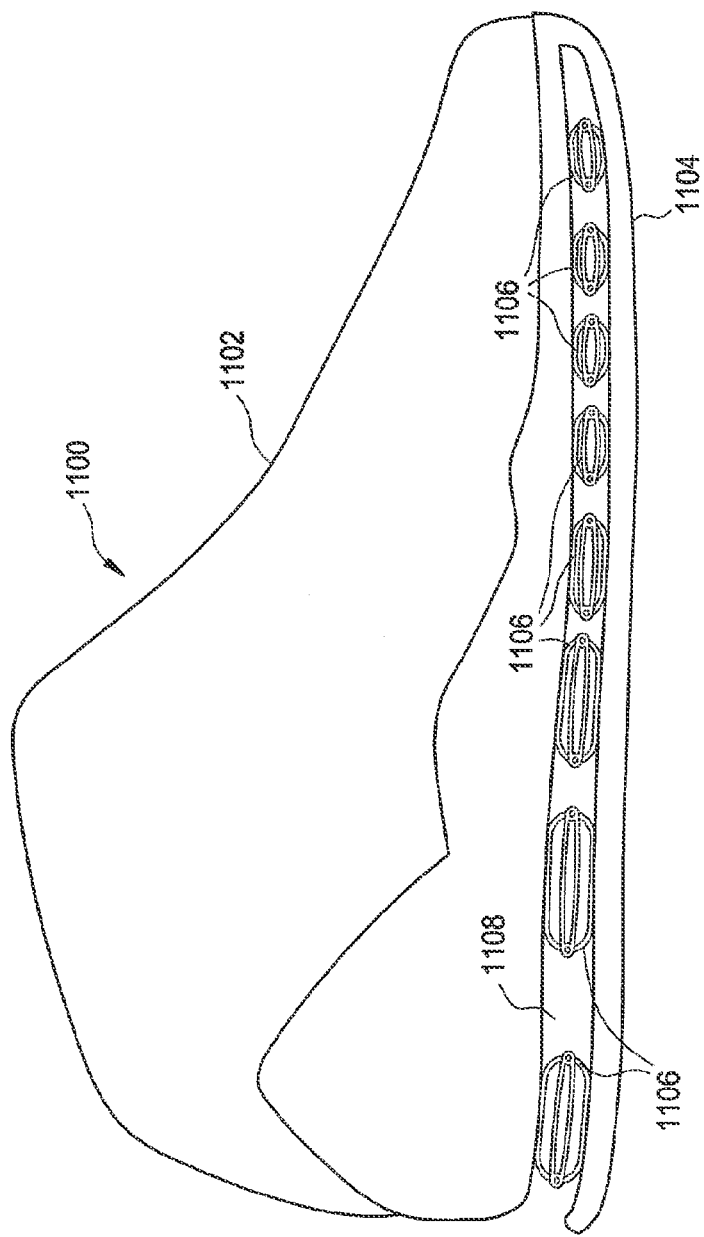
FIG. 11 illustrates an example piece of footwear or other foot-receiving device including impact attenuating and spring elements at various locations in accordance with this invention.

As noted above, one or more impact attenuating and spring elements in accordance with at least some aspects of this invention may be used as impact attenuating and/or spring elements in pieces of footwear or other foot-receiving devices. FIG. 11 generally illustrates an example piece of footwear (or other foot-receiving device) 1100 that includes an upper member 1102 and an outsole member 1104. One or more spring devices 1106 in accordance with aspects of this invention may be included at any suitable or desired location, e.g., between the upper member 1102 and the outsole member 1104, as part of a midsole or insole structure, etc. As shown in FIG. 11, the spring devices 1106 may be included in the heel area and/or in the toe area without departing from the invention. Impact attenuating and spring elements 1106 of the type described above may be provided in the arch area of a foot-receiving device to provide support for the arch, if desired.

In some examples, the piece of footwear or foot-receiving device 1100 may be constructed such that an open area 1108 is defined between at least a portion of the upper member 1102 and the outsole member 1104 (possibly part of the midsole structure may include the open area 1108), and one or more spring devices 1106 may be included in this open area 1108. In at least some examples, the open area 1108 may remain open and exposed in the final footwear or foot-receiving device product, e.g., without immediately surrounding foam, midsole structure, or other structural elements, akin to products available from NIKE, Inc. under the trademark SHOX. In other examples, the spring devices 1106 may be hidden (e.g., included in the midsole and/or outsole structure) and not readily visible to the user or retailers in the final footwear or foot-receiving device product without departing from the invention, although, if desired, access openings or windows may be provided.

Of course, the spring devices 1106 may be provided at any desired location in a footwear or other foot-receiving device product without departing from the invention. For example, one or more spring devices 1106 may be included as part of a footwear or foot-receiving device midsole, as part of the outsole, as an independent element, and/or in another part of the shoe without departing from the invention. Additionally or alternatively, one or more spring devices 1106 may be present in an open space (like space 1108) while others may be hidden in the same footwear or other foot-receiving device product. Other arrangements also are possible without departing from the invention.

Additional aspects of this invention relate to methods for providing footwear or foot-receiving devices including impact attenuating and/or spring elements of the type described above. As mentioned above, the stiffness characteristics of impact attenuating and spring elements according to examples of this invention can be easily changed, for example, by selecting structural features of the various elements of the impact attenuating device so as to provide different stiffness or impact attenuating characteristics (e.g., by changing the material of the spring member, changing the construction of the spring member, changing the number of spring members, changing the thickness of the spring members, etc.); by selecting body portions or members having different characteristics (e.g., different body materials, different body thicknesses, different body constructions (e.g., ribbed outer surface v. smooth outer surface, etc.); etc.

Various factors may be taken into consideration when determining the specific characteristics of spring member(s), body portion(s) or member(s), and/or overall impact attenuating and spring element(s) to place in a given piece of footwear or other foot-receiving device. For example, characteristics of the spring member(s), the body portion(s) or member(s), and/or the overall impact attenuating and spring element(s) may be selected based on one or more characteristics of the intended end user, such as: the user's weight, the user's shoe size, the user's foot width, the user's moving speed, the user's jumping ability, the user's gait or stride (e.g., a pronation or supination tendency, etc.), and the like. Also, different spring member(s), body portion(s) or member(s), and/or overall impact attenuating and spring element(s) may be selected depending on the final intended end use of the footwear or other foot-receiving device product. For example, different impact attenuating and spring elements or one or more portions thereof (e.g., having different stiffnesses) may be selected depending on whether the footwear or foot-receiving device is used for walking, running, basketball, soccer, football, baseball, softball, sprinting, track events, field events, cross-training, video game play, training exercises, etc.

The potential variability features allow manufacturers, wholesalers, retailers, users, or others to selectively determine and/or change the stiffness or impact attenuation characteristics of a piece of footwear or other foot-receiving device by selecting different impact attenuating and spring elements and/or portions of impact attenuating and spring elements. In this manner, if desired, manufacturers, wholesalers, retailers, users, or others can customize a pair of footwear or other foot-receiving device, e.g., based on one or more characteristics of the intended user and/or one or more characteristics of the ultimate intended end use of the product. Moreover, this customization can take place at any stage in the distribution chain, for example, at the construction factory by the manufacturer, by wholesalers or retailers (e.g., at a warehouse or a point of sale location, to replenish depleted stock, etc.), by consumers at the time and/or after the product has been purchased, etc. As one example, the characteristics of the impact attenuating and spring element(s) and/or portions thereof may be selected at the assembly factory for a given pair of shoes, and these shoes may then be marketed specifically targeted to specific users or use characteristics (e.g., the sales box and/or a tag on the shoe might indicate that the shoe is designed for running or jogging for a user between 165 and 180 lbs.). Shoes for a series of different uses and for different user weights (or other characteristics) may then be marked on boxes or tags (depending on the characteristics of the impact attenuating and spring element used) and placed in the market.

As another example, shoe retailers or wholesalers may have a supply of impact attenuating and spring elements or portions thereof available to insert into the footwear or foot-receiving device at the point of sale location, e.g., based on the characteristics of the intended user, the intended use, and/or to replenish depleted stock. As still another example, user's may be allowed to freely select and/or change impact attenuating and spring elements or portions thereof, based on their immediate needs and/or the characteristics they desire in the footwear or foot-receiving devices (e.g., by switching one or more impact attenuating and spring elements or portions thereof for others at a point of use location). Impact attenuating and spring elements labeled with various different characteristics (e.g., for different user characteristics or intended use characteristics as described above) may be made available to users. These aspects of the invention work particularly well for footwear and foot-receiving device designs in which the spring elements remain visible and/or are otherwise easily accessible by the user after the device is fully assembled.

As another example, methods according to aspects of the invention further may include providing at least an upper member and a sole member for a piece of footwear or other foot-receiving device. Based at least in part on a characteristic of an intended user of the piece of footwear or the device or a characteristic of an intended use of the piece of footwear or device, at least a portion of an impact attenuating and spring element may be selected or identified for inclusion in the piece of footwear or in the device. As mentioned above, this selection may occur, for example, at the manufacturing location, at a wholesaler location, at a retailer location, after retail purchase, at a point of use location, etc. The impact attenuating and spring element may be included at the desired location in the piece of footwear or other foot-receiving device, e.g., between the upper member and the sole member, engaged (directly or indirectly) with at least a portion of the upper member and/or the sole member, etc.

If desired, a user may change the characteristics of a piece of footwear or other foot-receiving device by removing one or more the impact attenuating and spring elements and/or portion(s) thereof and replacing it/them with new impact attenuating and spring elements or portions thereof. This feature also can be used to replace a broken impact attenuating and spring element, to customize a foot-receiving device for a new user, customize a foot-receiving device for changing user or use conditions, etc.

D. Conclusion

While the invention has been described with respect to specific examples including presently preferred modes of carrying out the invention, those skilled in the art will appreciate that there are numerous variations and permutations of the above described systems and methods. Thus, the spirit and scope of the invention should be construed broadly as set forth in the appended claims.

We claim:

1. A device comprising:
   a spring device including:
      a plurality of first body portions;
      a plurality of second body portions, wherein the first body portions and the second body portions, at least in part, define a base orientation of the device and wherein an open space is defined between the first body portions and the second body portions;
      a plurality of spring members at least partially included in the open space, each spring member having a first end and a second end;
      a first shaft pivotally connecting the first ends of the spring members to first ends of the first body portions and to first ends of the second body portions; and
      a second shaft pivotally connecting the second ends of the spring members to second ends of the first body portions and to second ends of the second body portions;
   a first base; and
   a second base spaced from the first base, the spring device being positioned between the first base and the second base
   wherein the first base and the second base each include a plurality of slots formed therein, each slot in the first base receiving a portion of one of the first body portions, and each slot in the second base receiving a portion of one of the second body portions; and
   wherein a force applied to at least one of the first body portions or the second body portions so as to change the device out of the base orientation causes the spring members to exert a force that urges the device toward the base orientation.

2. The device according to claim 1, wherein each spring member comprises a solid band extending from the first end to the second end.

3. The device according to claim 1, wherein the first ends of the spring members include a first aperture to receive the first shaft and the second ends of the spring members include a second aperture to receive the second shaft.

4. The device according to claim 1, wherein the spring members extend parallel to one another.

5. The device according to claim 1, wherein the spring members are polymeric elements that stretch under a tensile force.

6. The device according to claim 1, wherein the spring members extend across the open space at a central location between the first body portions and the second body portions.

7. The device according to claim 1, further comprising a plurality of additional spring devices positioned between the first base and the second base.

8. The device according to claim 1, wherein the first base and the first body portion may be formed of a single piece of material, and the second base and the second body portion may be formed of a single piece of material.

9. A foot-receiving device, comprising:
an upper member;
a sole member engaged with the upper member; and
an impact attenuating/spring device engaged with at least one of the upper member or the sole member, the impact attenuating/spring device including:
a spring device including:
a plurality of first body portions;
a plurality of second body portions, wherein the first body portions and the second body portions, at least in part, define a base orientation of the device and wherein an open space is defined between the first body portions and the second body portions;
a plurality of spring members at least partially included in the open space, each spring member having a first end and a second end;
a first shaft pivotally connecting the first ends of the spring members to first ends of the first body portions and to first ends of the second body portions; and
a second shaft pivotally connecting the second ends of the spring members to second ends of the first body portions and to second ends of the second body portions;
a first base; and
a second base spaced from the first base, the spring device being positioned between the first base and the second base;
wherein the first base and the second base each include a plurality of slots formed therein, each slot in the first base receiving a portion of one of the first body portions, and each slot in the second base receiving a portion of one of the second body portions; and
wherein a force applied to at least one of the first body portions or the second body portions so as to change an orientation of the impact attenuating/spring device causes the spring members to exert a force that urges the impact attenuating/spring device toward its original orientation.

10. The foot-receiving device according to claim 9, wherein the impact attenuating/spring device is located in a heel area.

11. The foot-receiving device according to claim 9, wherein the impact attenuating/spring device is at least partially visible when foot-receiving device is in use.

12. The foot-receiving device according to claim 9, wherein each spring member comprises a polymeric element that stretches under a tensile force.

13. The foot-receiving device according to claim 9, wherein each spring member comprises a solid band extending from the first end to the second end.

14. The foot-receiving device according to claim 9, wherein the first ends of the spring members include a first aperture to receive the first shaft and the second ends of the spring members include a second aperture to receive the second shaft.

15. The foot-receiving device according to claim 9, further comprising a plurality of additional spring devices positioned between the first base and the second base.

16. A foot-receiving device comprising:
an upper member;
a sole member engaged with the upper member;
a first base positioned between the upper member and the sole member and engaged with the sole member;
a second base spaced from the first base and engaged with the upper member; and
a plurality of spring device portions positioned between the first base and the second base, each spring device portion including:
a plurality of first body portions;
a plurality of second body portions, wherein the first body portions and the second body portions, at least in part, define a base orientation of the device and wherein an open space is defined between the first body portions and the second body portions;
a plurality of spring members at least partially included in the open space and having a first end and a second end;
a first shaft pivotally connecting the first ends of the spring members to first ends of the first body portions and to first ends of the second body portions; and
a second shaft pivotally connecting the second ends of the spring members to second ends of the first body portions and to second ends of the second body portions;
a first base; and
a second base spaced from the first base, the spring device being positioned between the first base and the second base
wherein the first base and the second base each include a plurality of slots formed therein, each slot in the first base receiving a portion of one of the first body portions, and each slot in the second base receiving a portion of one of the second body portions; and
wherein when a force is applied to at least one of the first body portions or the second body portions so as to change an orientation of the device, the spring members exert a force that urges the device toward its original orientation.

* * * * *